United States Patent
Kanda et al.

[11] Patent Number: 5,900,709
[45] Date of Patent: May 4, 1999

[54] ROTATION CONTROL DEVICE

[75] Inventors: Hidehiro Kanda, Hachioji; Mitsuo Uzuka, Urawa; Tadayoshi Ikeda; Tadashi Miwa, both of Hachioji; Masahiro Makita, Hino, all of Japan

[73] Assignee: Konica Corporation, Tokyo, Japan

[21] Appl. No.: 08/803,361

[22] Filed: Feb. 20, 1997

[30] Foreign Application Priority Data

Feb. 23, 1996 [JP] Japan .................................. 8-036897
Feb. 23, 1996 [JP] Japan .................................. 8-036898
Feb. 26, 1996 [JP] Japan .................................. 8-038232

[51] Int. Cl.⁶ ........................................... G05B 1/06
[52] U.S. Cl. .................... 318/652; 318/568.22; 318/138; 318/439; 318/254; 318/606; 318/632; 318/638; 388/813
[58] Field of Search ................ 318/652, 568.22, 318/798–815, 138, 439, 254, 606, 632, 638; 388/813, 805

[56] References Cited

U.S. PATENT DOCUMENTS 4,972,186 11/1990 Morris .................................. 318/661 X
5,225,755 7/1993 Okamoto .............................. 318/561 X
5,617,266 4/1997 Kaniwa et al. ....................... 388/812 X
5,625,424 4/1997 Conner et al. ....................... 318/807 X
5,631,999 5/1997 Dinsmore ............................. 318/138 X
5,672,949 9/1997 Ward ....................................... 318/609
5,696,642 12/1997 Sawamura et al. ................. 388/811 X

FOREIGN PATENT DOCUMENTS 4-140088 5/1992 Japan ................................ H02P 5/00

Primary Examiner—Karen Masih
Attorney, Agent, or Firm—Frishauf, Holtz, Goodman, Langer & Chick

[57] ABSTRACT

In a rotation detection apparatus, a magnetism pattern section provided with plural magnetic poles and a FG (frequency generating) pattern section provided with plural toothed wire circuits are located so as to face each other. When either one of the magnetism pattern section and the FG pattern section is rotated together with a rotating member, plural wave signals are electrically induced in the plural toothed wire circuits. A signal processing cicuit synthesizes the plural wave signals so as to output a multiplication signal and detects the rotation of the rotating member based on the multiplication signal.

24 Claims, 24 Drawing Sheets

FIG. 17
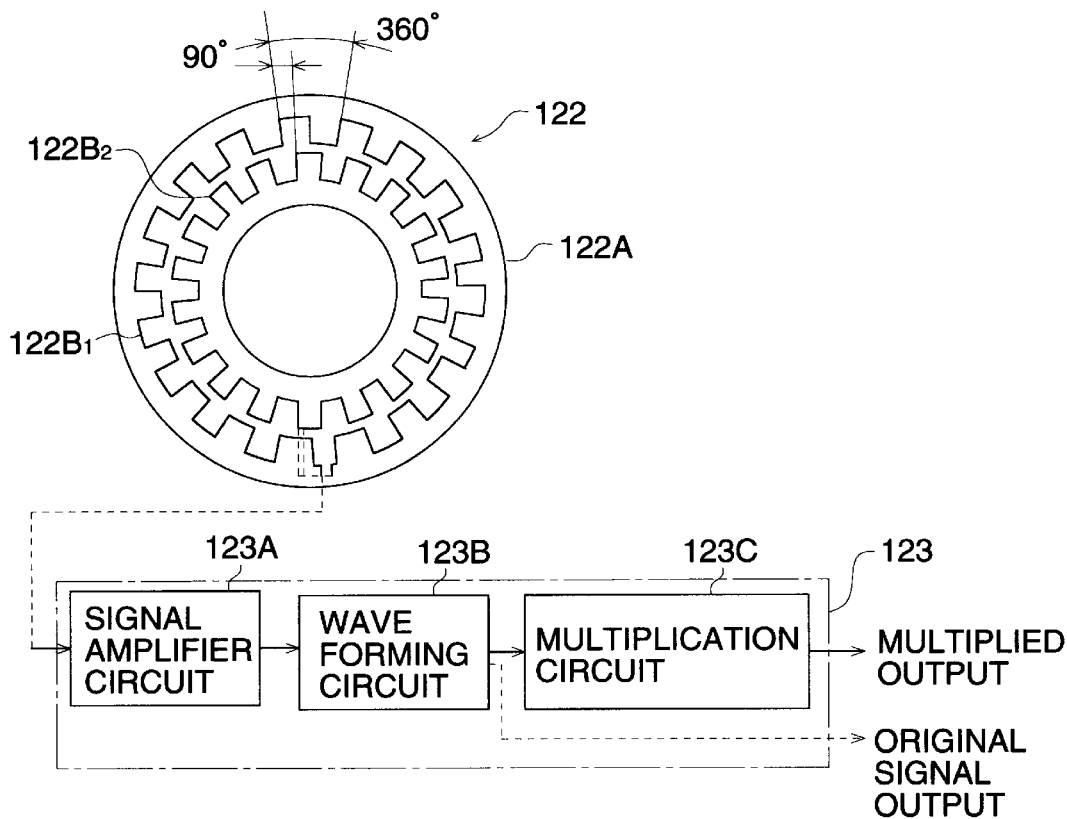
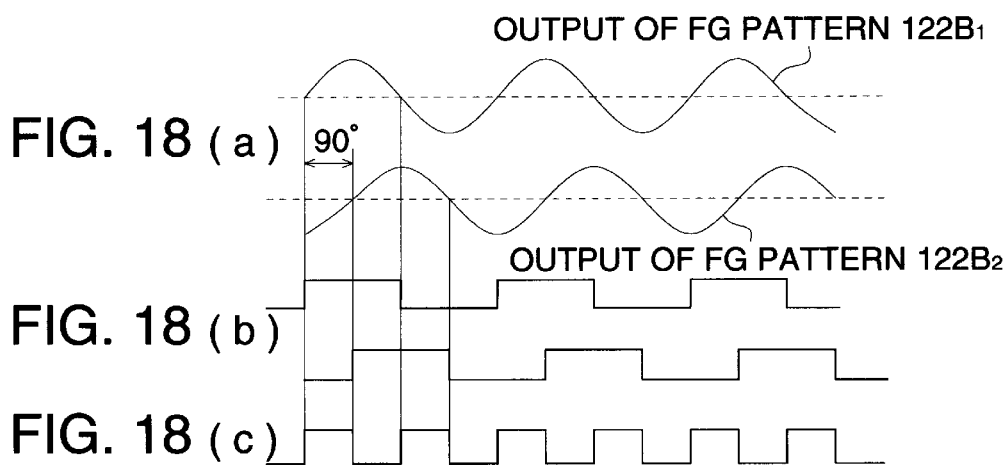

FIG. 19
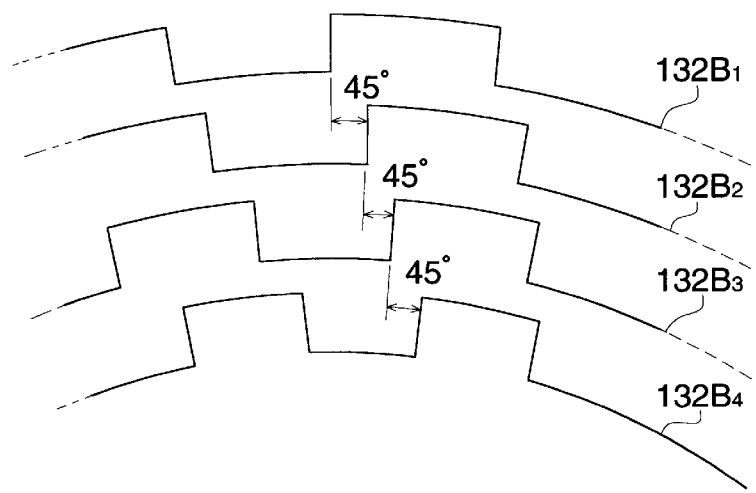
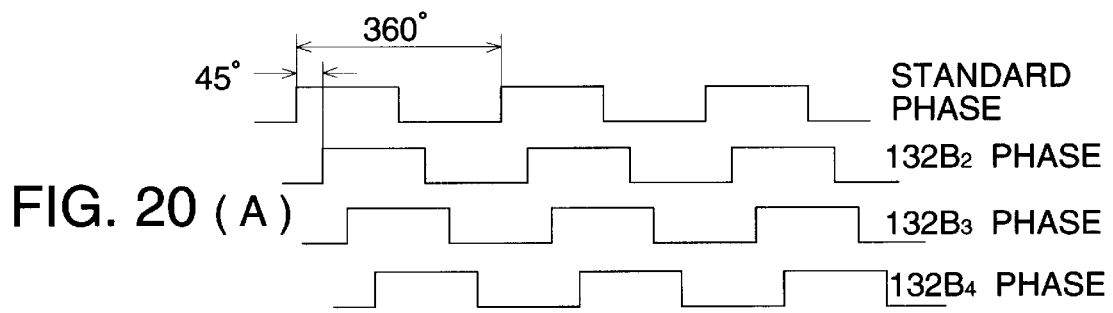

ROTATION CONTROL DEVICE

BACKGROUND OF THE INVENTION

The present invention relates to a device which detects the state of rotation of a drum, a roller or a motor used in, for example, an image forming apparatus, and in particular, to a rotation control device wherein a phase of detection signals showing the state of rotation is corrected.

As a conventional rotation detector used in the case of controlling rotation of a rotating body, there have been known, for example, a detector which detects the state of rotation of a drum and a roller of an image forming apparatus, and a detector used for controlling the rotational speed of a motor. In these rotation detectors, an optical encoder having a slit for detecting the state of rotation of a rotating body such as a drum is commonly used. This optical encoder having a slit is one wherein ON/OFF or light (or intensity of light) emitted from a light-emitting element at an edge of a slit is detected. by a light-receiving element, and the rotational speed of the drum is obtained based on a change of signals generated by the light-receiving element.

In addition to the optical encoder, an FG pattern encoder is also used commonly for detecting the rotational speed of a motor. The FG pattern encoder is one wherein a magnetism pattern having thereon multi-poles magnetized in the rotary direction is rotated together with a motor, and thereby induced electromotive force is produced on a circular and comb-shaped wire circuit (FG pattern) which is formed at a position facing the magnetism pattern so that the rotational speed of the motor may be detected.

The rotation detector like one explained above is required to be capable of detecting the state of rotation at a high precision. For this purpose, it is effective to enhance a detecting precision by increasing the number of pulses of detection signals which are generated in the rotation detector and show the state of rotation. For example, in the case of a certain optical encoder, plural optical encoders are arranged so that a phase of each detection signal may be deviated, and multiplication detection signal is generated from each detection signal for increasing the number of pulses. In the case of the FG pattern encoder, there is known the one wherein plural FG patterns whose phases are deviated are formed and multiplication detection signal is generated from the phase-deviated signal generated from the plural FG patterns for improving a detecting precision in a device disclosed, for example, in Japanese Patent Publication Open to Public Inspection No. 140088/1992 (hereinafter referred to as Japanese Patent O. P. I. Publication).

However, in the case of detection of the rotational speed of a drum by means of an optical encoder employing a slit, when an external disturbance such as a vibration generated inside or outside an image forming apparatus is inflicted to an optical encoder, for example, this external disturbance causes the slit to vibrate. Due to this vibration of the slit, its component is contained in detection signals undesirably when ON/OFF of light is detected at an edge of the slit. It is therefore impossible to detect the accurate rotational speed of a drum, which results in a problem that unevenness is caused in the rotational speed of the drum.

Further, in the case of a conventional electrophotographic apparatus among image forming apparatuses, for example, it generally is of the structure that a drive motor is controlled based on the results of detection made by an encoder provided on the drive motor for a photoreceptor drum, without being of the structure that the rotation of the drum is controlled based on the rotational speed of the photoreceptor drum detected directly. Therefore, it is difficult to drive the drum at higher rotational accuracy, which has been a problem.

In the case of an FG pattern encoder, there is a problem that an error is caused in a phase difference established in advance and a detecting precision is lowered similarly to the occasion of an optical encoder, for the causes such as, for example, a processing precision in forming FG patterns, an establishment of a threshold value in forming a waveform from signals generated at each FG pattern, and an amplitude difference of each signal.

For example, when forming a waveform from signals having a difference in amplitude generated at each FG pattern, generated signals contain high frequency noise components as shown in FIG. 33(a). When these signals are subjected to threshold value judgment with a ground level serving as a threshold value, glitch (chattering) is generated in the signals after waveform forming, and positions of the rise and fall are deviated, because the noise component is picked up even when the center value of the signals does not reach the ground level. Accordingly, it is impossible to judge surely that the signal has reached the ground level. For judging surely that the signal has reached the ground level, it is necessary to establish the threshold value by shifting it from the ground level. For example, when the threshold value is set to be higher than the ground level as shown in FIG. 33(b), it is possible to judge surely that the signal is not lower than the ground level. However, when the threshold value is set to be higher than the ground level, a difference of an amplitude of signals generated at FG patterns causes edges of the rise and fall of a square wave to be shifted, and phase deviation is caused in the square wave. FIG. 33(c) shows the signals formed after waveform forming of the signals having a difference of an amplitude. As shown in FIG. 33(d), even when a hysteresis is provided by establishing a threshold value for each of the rise and fall, phase deviation is caused in the square wave similarly to the occasion where the threshold value is set to be higher than the ground level.

Further, in the case of a conventional rotation detector outputting a sine wave as a detection signal such as an FG pattern encoder, a magnetic encoder and a resolver, when forming a waveform from detection signals, the duty of the signal after waveform forming does not reach 50% if offset adjustment is not conducted correctly. When such signals are use for composing multiplication signals, for example, a phase difference (jitter) is caused undesirably at the rise and fall of the signals, resulting in a problem that rotation detection at a high precision is difficult.

SUMMARY OF THE INVENTION

For maintaining a high rotational precision of a rotating body, it is important to control the rotation by detecting correctly the state of rotation of the rotating body, and it is especially effective for drum rotation in an electrophotographic apparatus, when shortening statically determining time by inhibiting load variation such as ON/OFF of a cleaning blade, and when conducting accurate control of low speed rotation at a low speed (not more than several tens r.p.m.).

The present invention has been achieved in view of the problems mentioned above, and its object is to provide an image forming apparatus wherein the state of rotation of a rotating body rotated by a drive means can be detected accurately, and the rotating body can be controlled in terms of drive in accordance with the detected state of rotation.

The present invention has been achieved in view of the problems mentioned above, and its object is to provide a rotation control device which can detect the state of rotation at a high precision even when an error of a phase difference is caused in a detection signal showing the state of rotation, and thereby can control surely the rotation.

The present invention is represented, therefore, by an image forming apparatus equipped with a rotary body rotated by a drive means wherein a rotation detecting means which detects the state of rotation of aforesaid rotating body with an interaction of both a magnetism pattern section having plural magnetic poles and an FG pattern section having wire circuits corresponding to aforesaid plural magnetic poles, and a control means which controls the rotation of the rotating body based on the state of rotation mentioned above detected by the rotation detecting means.

As a concrete structure of the rotation detecting means mentioned above, it is preferable that the magnetism pattern section has aforesaid plural magnetic poles arranged in the rotary direction to be concentric with the rotation shaft of the rotating body, and aforesaid circular and comb-shaped wire circuits having the pattern of recessed portions and projected portions in quantity identical to that of the plural magnetic poles are formed at the position where the FG pattern section faces the magnetism pattern section to be away from it by a certain distance, and thus, the state of rotation of the rotating body can be detected based on the induced electromotive force generated on the FG pattern section when the magnetism pattern section and the FG pattern section rotate relatively in accordance with the state of rotation of the rotating body.

In the structure mentioned above, when the magnetism pattern section and the FG pattern section rotate relatively, a magnetic field of the magnetism pattern section and a circular comb-shaped wire circuits of the FG pattern section cross each other to generate induced electromotive force, and voltage signals corresponding to the state of rotation are generated. Based on the voltage signals, the state of rotation of a rotating body is detected, and the rotating body is controlled by the control means in accordance with the state of rotation.

It is preferable that the magnetism pattern section rotates together with the rotating body and the FG pattern section is fixed on the rotating body in the rotation detecting means.

Or, it is preferable that the magnetism pattern section is fixed on the rotating body and the FG pattern section rotates together with the rotating body in the rotation detecting means.

It is preferable that the rotation detecting means is provided with a brush which slides on a pattern of the FG pattern section.

In such a structure, signals generated at the FG pattern section can be outputted through the brush.

It is preferable that the rotation detecting means is provided with a noise removing section which removes a noise generated by the brush mentioned above.

In the structure mentioned above, a noise component of the signals outputted by the noise removing section through the brush can be removed.

It is preferable that the rotation detecting means is provided with an amplifier section which amplifies output signals of the FG pattern section and a waveform forming section which form a waveform from output signals of the amplifier section, and the amplifier section and the waveform forming section are arranged on the same board for the FG pattern section.

In the structure mentioned above, the state of rotation of the rotating body can be detected by the minute output signals generated on the FG pattern section.

It is preferable that the rotation detecting means is provided with an adjustment means which adjusts a clearance between the magnetism pattern section and the FG pattern section.

In the structure mentioned above, a clearance between the magnetism pattern section and the FG pattern section can be adjusted by the adjustment means.

It is preferable that the rotation detecting means is provided with an electromagnetism-protection means which protects an electromagnetic field generated on the magnetism pattern section and the FG pattern section against an electromagnetic field entering from the outside.

In the structure mentioned above, the electromagnetism-protection means causes an operation the rotation detecting means not to be affected by an electromagnetic field from the outside.

As the concrete structure of the invention, a rotating body provided on an electrophotographic apparatus can also be applied as the rotating body mentioned above.

As stated above, the invention wherein the rotation of a rotating body is controlled in accordance with the state of rotation of the rotating body makes the rotating body to be driven at a high precision of rotation. Further, owing to the structure wherein the state of rotation of a rotating body is detected at the magnetism pattern section and the FG pattern section, the detection method is of a type of integral for entire circumference and the state of rotation of a rotating body can be detected more accurately without being affected by an external disturbance such as a vibration, compared with a conventional rotation detector of an optical encoder type. In addition, it is possible to make an apparatus to be small in size and to be inexpensive.

When a noise removing section is provided in the occasion wherein a rotation detecting means is provided with a brush, the state of rotation of a rotating body can be detected surely without being affected by the noise caused by the brush.

In addition, it is possible to detect the state of rotation of a rotating body accurately even when the signal generated at the FG pattern section is minute, and it is further possible to provide a smaller device by arranging the amplifier section and FG pattern section on the same board.

Owing to an adjustment means provided, a clearance between a magnetism pattern section and an FG pattern section can easily be adjusted, which makes it possible to improve maintainability.

Owing to an electromagnetism-protecting means provided, mixing of an electromagnetic noise is reduced, resulting in stable control, and it is possible to prevent that the magnetism pattern section is demagnetized in process of time by a strong electromagnetic field such as a charging unit, in the case of an electrophotographic apparatus, for example.

Even in the case of a rotating body of an electrophotographic apparatus, the state of rotation thereof can be controlled with high accuracies.

Another example of the invention is represented by a device in which an FG pattern section provided with a circular and comb-shaped wire circuits having recessed portions and projected portions in quantity identical to that of the magnetic poles is arranged at a location to face a magnetism pattern section having plural magnetic poles in the rotary direction, and the state of rotation of a rotating body is detected based on induced electromotive force generated on the FG pattern section when the magnetism pattern section and the FG pattern section rotate relatively and concentrically in accordance with the rotation of the rotating body, wherein the FG pattern section is structured so that the plural circular and comb-shaped wire circuits are formed on the same plane to be deviated each other in terms of phase, and there is provided a signal processing means which composes signals generated by the plural wire circuits and outputs the signal with multiplication frequency showing the state of rotation of the rotating body.

In the structure mentioned above, when the magnetism pattern section and the FG pattern section rotate relatively and concentrically in accordance with the rotation of the rotating body, voltage signal having an amplitude which is mostly the same each other and being deviated each other in terms of phase is generated on each of the plural circular and comb-shaped wire circuits formed on the same plane, on the FG pattern section. The voltage signals are composed by the signal processing means to become the signal with multiplication frequency showing the state of rotation of a rotating body.

It is further preferable that a radius of each of the plural circular and comb-shaped wire circuits is different each other on the FG pattern section.

In the structure mentioned above, circular and comb-shaped wire circuits of the FG pattern section can be formed concentrically on the same plane.

It is further preferable that a length of an operating conductor crossing with a magnetic field of the magnetism pattern section in aforesaid plural circular and comb-shaped wire circuits is almost the same each other on the FG pattern section.

In the structure mentioned above, on each of aforesaid plural circular and comb-shaped wire circuits on the FG pattern section, there is generated a signal whose amplitude is more identical to others.

It is preferable that the phase mentioned above is caused to be $(180/n)°$ when the number of aforesaid circular and comb-shaped wire circuits is n in the FG pattern section.

An effect of the invention based on aforesaid means for solution is that a detection signal having a greater number of pulses compared with the number of pulses of the signal generated in the case of one-fold wire circuit on the FG pattern section can surely be generated and the state of rotation of a rotating body can be detected with high accuracies, when a signal having an amplitude that is mostly the same as others and deviated phase is generated on each of plural wire circuits on the same plane of an FG pattern section and a signal with multiplication frequency in accordance with the state of rotation of a rotating body is generated on a signal processing means. In addition, since plural wire circuits of the FG pattern section are formed on the same plane, it is possible to make a device small. Further, compared with rotation detection by means of a conventional optical encoder, a method for detecting with a magnetism pattern section and an FG pattern section is of a type of integral for entire circumference, and therefore it is possible to detect the state of rotation accurately without being affected by external disturbance such as a vibration.

Still another example of the invention is represented by a rotation control device capable of detecting and controlling the state of rotation of a rotating body based on plural detection signals each having a phase difference established in advance generated in accordance with the state of rotation of the rotating body, wherein a clock generating means which generates a standard clock signal with a prescribed frequency, a clock delay means which generates delay clock signals obtained by delaying the standard clock signal in accordance with a phase difference established in advance, a rotation detection signal generating means which detects a phase difference between the standard clock signal and the standard signal with either one of aforesaid plural detection signals serving as a standard signal, then detects a phase difference between the delay clock signal and the other detection signal, and generates rotation detection signals showing the state of rotation of the rotating body in accordance with the detected phase difference, and the first control means which controls the rotation of the rotating body in accordance with the rotation detection signal, are provided.

It is preferable that the rotation detection signal generating means is provided, as a concrete structure, with a multiplication signal generating means which generates plural multiplication signals from the plural detection signals, the first standard signal control means which generates signals in accordance with a phase difference between the standard clock signal and the standard multiplication signal with either one signal out of the plural multiplication signals serving as a standard multiplication signal and conducts weighing by amplifying the signals with the prescribed degree of amplification, the first other signal control means which generates signals in accordance with a phase difference between the delay clock signal and the other multiplication signal and conducts weighing by amplifying the signals with a degree of amplification that is smaller than the prescribed degree of amplification, and with the first signal composing means which composes signals generated by the first standard signal control means and the first other signal control means and generates the rotation detection signals.

It is preferable that the rotation detection signal generating means is provided, as another concrete structure, with a multiplication signal generating means which generates plural multiplication signals from the plural detection signals, the second standard signal control means which generates signals in accordance with a phase difference between the standard clock signal and the standard multiplication signal with either one signal out of the plural multiplication signals serving as a standard multiplication signal and outputs D.C. component and A.C. component of the signals, the second other signal control means which generates signals in accordance with a phase difference between the delay clock signal and the other multiplication signal and outputs only A.C. component of the signals, and with the second signal composing means which composes signals generated by the second standard signal control means and the second other signal control means and generates the rotation detection signals.

In the structure mentioned above, a phase difference of detection signals is detected based on a standard clock signal and a delay clock signal, and based on the detected phase difference, there are generated composed signals which are less affected by an error of a phase difference.

It is preferable that a rotation control device capable of detecting and controlling the state of rotation of a rotating body based on plural detection signals each having a phase difference established in advance generated in accordance with the state of rotation of the rotating body, is provided with a phase error detection means which measures a phase difference between the detection signals based on the plural detection signals and detects an error between the measured phase difference and the phase difference established in advance, a correcting means which generates correcting detection signals in accordance with the phase error detected by the phase error detection means, and with the second control means which the rotation of the rotating body in accordance with the correcting detection signals.

It is preferable that the phase error detection means is provided with a pulse signal generating means which generates multiplication pulse signals from the plural detection signals, a means for measuring the first pulse interval from the rise to the fall of the pulse signal, a means for measuring the second pulse interval from the fall to the rise of the pulse signal, and with a deviation amount detecting means which compares the first pulse interval with the second pulse interval and obtains an amount of deviation from duty 50% of the pulse signal, and the correcting means corrects the pulse signal in accordance with an amount of deviation from duty 50% of the pulse signal detected by the phase error detection means.

It is preferable, in the phase error detection means, that the pulse signal generating means generates multiplication pulse signals from detection signals generated when the rotating body is rotated at a prescribed rotational speed, the means for measuring the first and second pulse intervals counts the first and second pulse intervals by the use of prescribed clock signals, the deviation amount detecting means calculates a half of the difference of each counted number of the first and second pulse intervals as an amount of deviation from duty 50% of the pulse signal and stores it, and the correcting means corrects each counted number of the first and second pulse intervals in accordance with the amount of deviation stored by the phase error detection means.

In the structure mentioned above, pulse intervals of multiplication pulse signals generated from detection signals are measured, and deviation from duty 50% of pulse signals caused by an error of a phase difference is corrected, thereby, signals having the pulse intervals which are mostly the same each other can be generated.

It is preferable that the phase error detection means is provided with a standard phase difference calculating means which calculates a standard phase difference for aforesaid plural detection signals based on a cycle of a standard phase detection signal which is either one of aforesaid plural detection signals, a phase difference calculating means which calculates respectively a phase difference of the standard phase detection signal and that of the other phase detection signal other than the standard phase detection signal, and an error calculating means which calculates an error of a phase difference of aforesaid each other phase detection signal for the standard phase detection signal from both the standard phase difference and aforesaid each phase difference, while the correcting means corrects a phase of aforesaid other phase detection signal in accordance with an error of aforesaid phase difference.

It is preferable, in the phase error detection means, that the standard phase difference calculating means and the phase difference calculating means calculate the standard phase difference and aforesaid each phase difference from plural detection signals generated when the rotating body is rotated at a prescribed rotational speed, the error calculating means calculates an error of the phase difference from both the standard phase difference and aforesaid each phase difference and stores it, and the correcting means corrects a phase of aforesaid other phase detection signal based on an error of aforesaid phase difference stored by the error calculating means.

In the structure mentioned above, an error of a phase difference of plural detection signals can be measured, and thereby, a phase of each detection signal can be corrected in accordance with the error of the phase difference.

It is preferable, in the phase error detection means, that aforesaid prescribed rotational speed at which the rotating body is rotated is one wherein unevenness of rotation is minimum.

As stated above, even when detection signals contain an error of a phase difference, the phase difference of the detection signals can be detected by the use of a standard clock signal and a delay clock signal, and thereby, the error of the phase difference can be corrected in accordance with the detected phase difference, in the invention. Therefore, the state of rotation can be detected with a high precision, and the rotation can be controlled surely.

Further, in the invention, even when detection signals contain an error of a phase difference, the error of the phase difference can be detected by a phase error detection means, and aforesaid correcting means can generate signals wherein the error is corrected. Therefore, an influence of an error of a phase difference is reduced, and the state of rotation can be detected with a high precision, resulting in sure control of the rotation.

In the invention, it is possible to detect an error of a phase difference accurately by making a rotating body to rotate at the rotational speed having the minimum unevenness of rotation, and thereby to detect the state of rotation with a high precision.

BRIEF DESCRIPTION OF THE DRAWINGS

FIG. 17 is a diagram showing an FG pattern section of the fifth embodiment of the invention.

FIGS. 18(a) to 18(c) are diagrams showing a signal waveform in the fifth embodiment of the invention.

FIG. 19 is a diagram showing an FG pattern section and a signal processing section in the sixth embodiment of the invention.

FIGS. 20(A) to 20(D) are diagrams illustrating operations of a multiplication circuit in the sixth embodiment of the invention.

DETAILED DESCRIPTION OF THE PREFERRED EMBODIMENT

Embodiments of the invention will be explained as follows, referring to drawings.

In this case, there will be explained, for example, an embodiment wherein a rotation detector of the present invention is applied to an electrophotographic apparatus.

Figure 1:
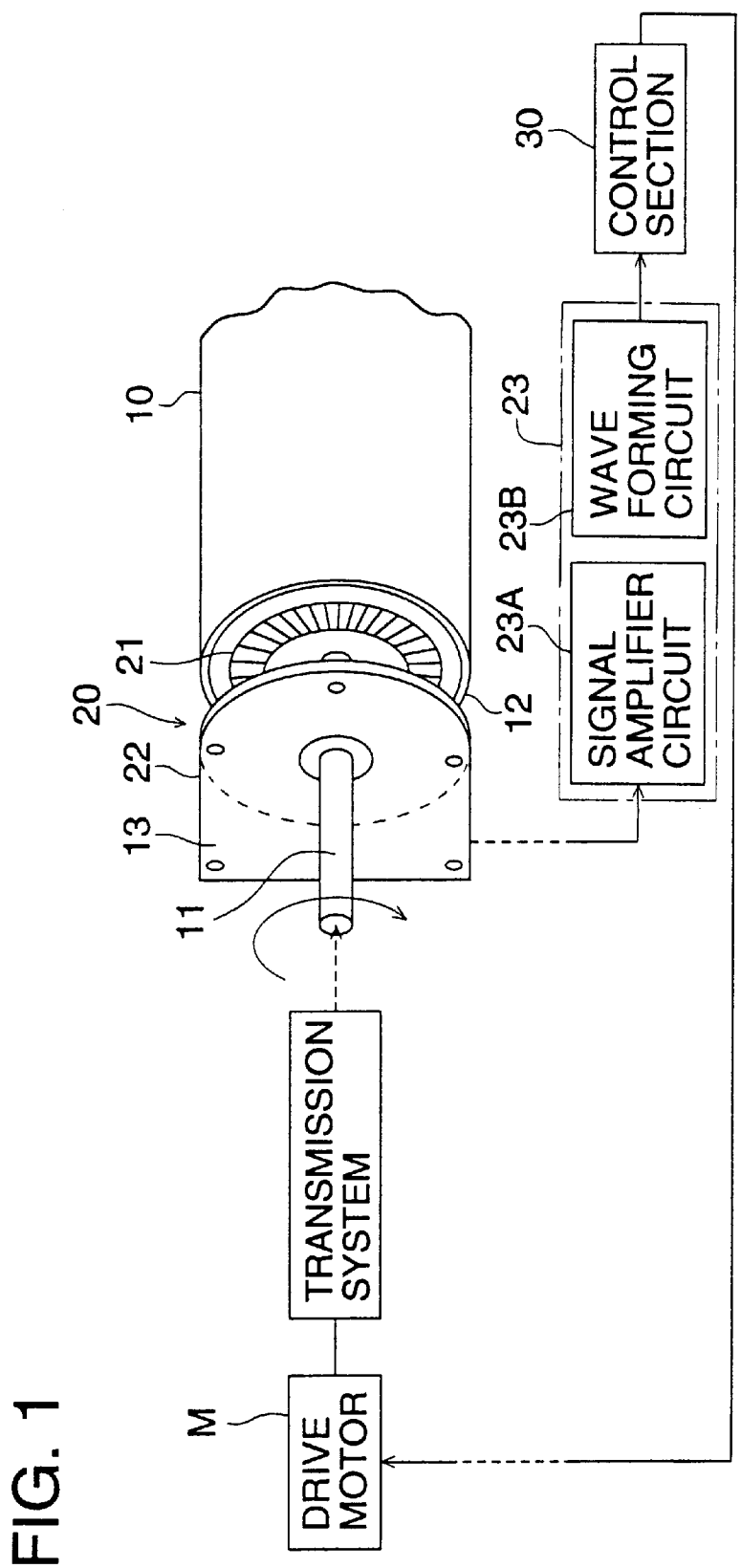
FIG. 1 is a diagram showing the schematic structure of the first embodiment of the invention.

FIG. 1 represents a diagram which shows schematic structure of the first embodiment, provided, however; that the diagram shows only the structure around a photoreceptor drum related to the invention in the electrophotographic apparatus. An explanation of other structural portions of the electrophotographic apparatus will be omitted because they are the same as those in a conventional electrophotographic apparatus.

In FIG. 1, an apparatus main body is structured to be equipped with photoreceptor drum 10 that serves as a rotor rotating around drum shaft 11 to record or read images, driving motor M severing as a driving means for driving the photoreceptor drum 10 to rotate, rotation detector 20 serving as a rotation detecting means that detects how the photoreceptor drum 10 rotates, and control section 30 serving as a control means that controls the driving motor M based on results of the detection made by the rotation detector 20.

Figure 2:
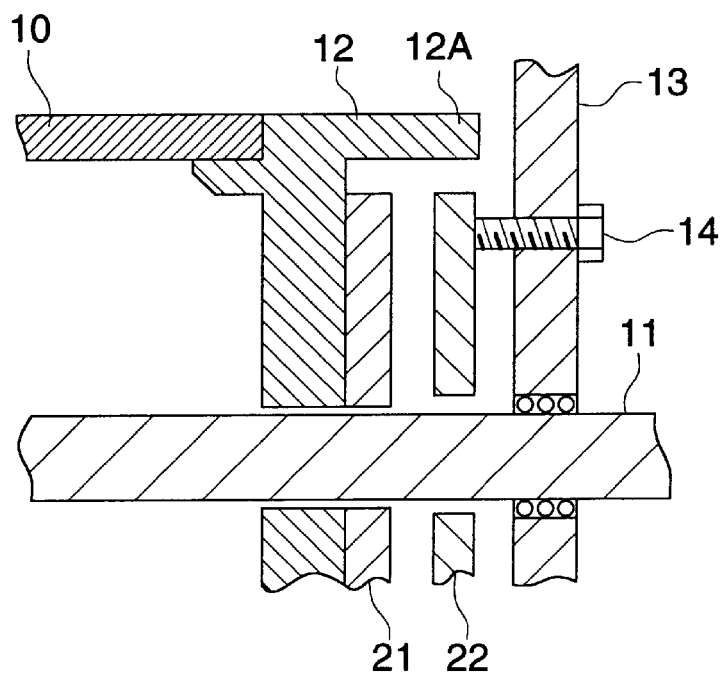
FIG. 2 is a sectional view of showing a photoreceptor drum and its vicinity in the first embodiment of the invention.
Figure 12:
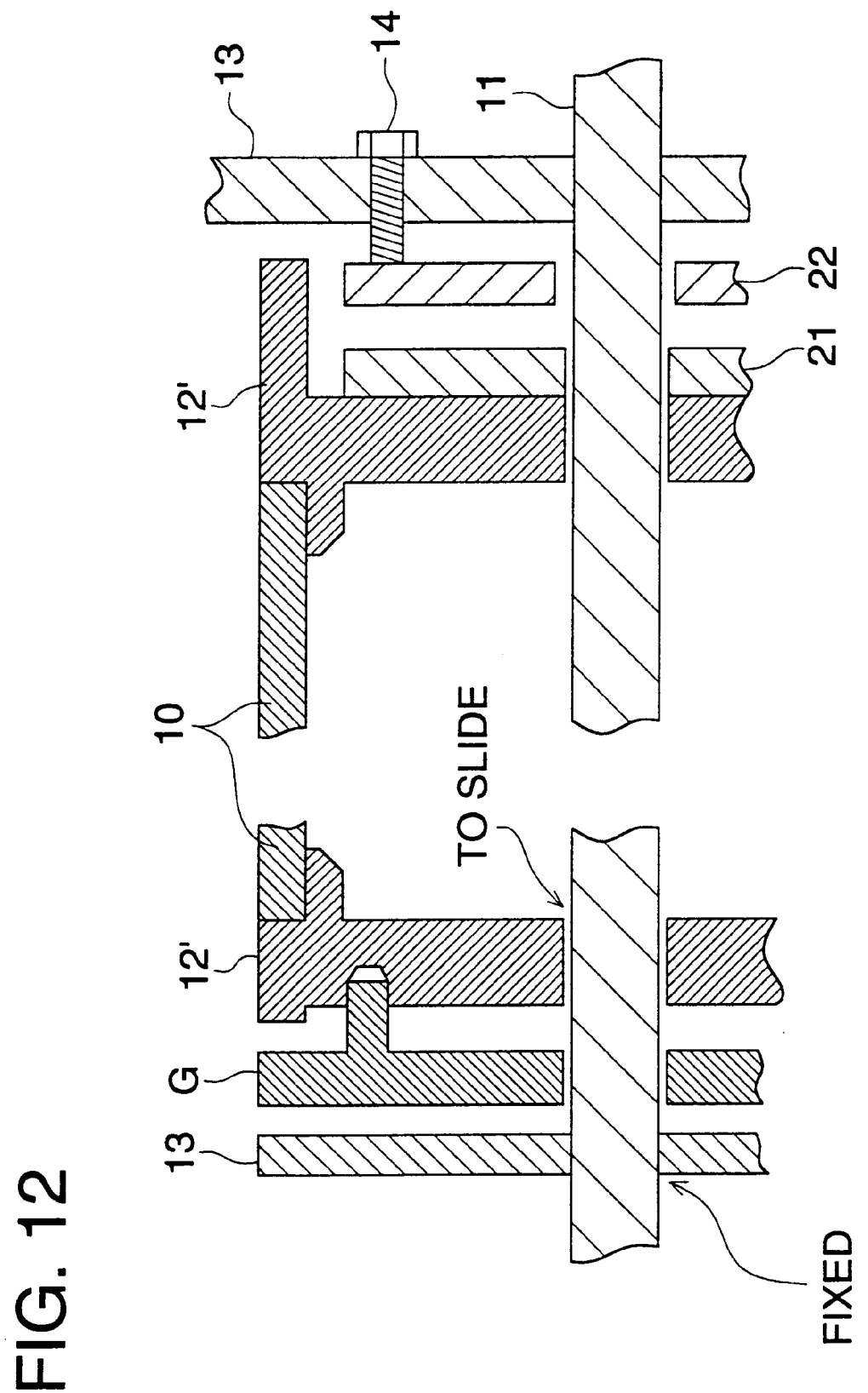
FIG. 12 is a diagram showing another structure of the photoreceptor drum.

The photoreceptor drum 10 is of a shape of a hollow cylinder, for example, wherein drum flange 12 is fixed on an end of the cylinder, and drum shaft 11 is fixed at the center of the drum flange 12, as shown in a sectional view in FIG. 2. Both ends of the drum shaft 11 are supported rotatably on side plates 13 which are for supporting the drum shaft. The drum flange 12 is equipped, on its outer circumference, with protruded portion 12A that serves as a means for preventing an electromagnetic field from penetrating from the outside against an electromagnetic field generated by rotation detector 20 formed by the use of materials of non-magnetic metal described later, for example. Incidentally, the photoreceptor drum 10 may also be of a structure wherein the drum shaft 11 is fixed on the side plate 13 and the photoreceptor drum 10 and drum flange 12' are driven to rotate by drum gear G as shown in FIG. 12.

As the driving motor M, there are used a DC motor, a DC brushless motor, an AC servomotor and a pulse motor, for example, which are the same as those used in a conventional electrophotographic apparatus. Driving force generated by the driving motor M is transmitted to one end of the drum shaft 11 through a drive transmitting system employing gears and belts and a speed reducing system. Incidentally, the driving force of the driving motor M may also be transmitted directly to one end of the drum shaft 11 without passing through the drive transmitting system and the speed reducing system.

The rotation detector 20 is composed of magnetism pattern section 21 fixed on the outer side of the drum flange 12 to be concentric with the drum shaft 11, FG pattern section 22 shown partially with broken lines in the figure and fixed on the side plate 13 to face the magnetism pattern section 21 with a certain clearance therefrom, and signal processing section 23 that processes signals outputted from the FG pattern section 22.

Figure 3:
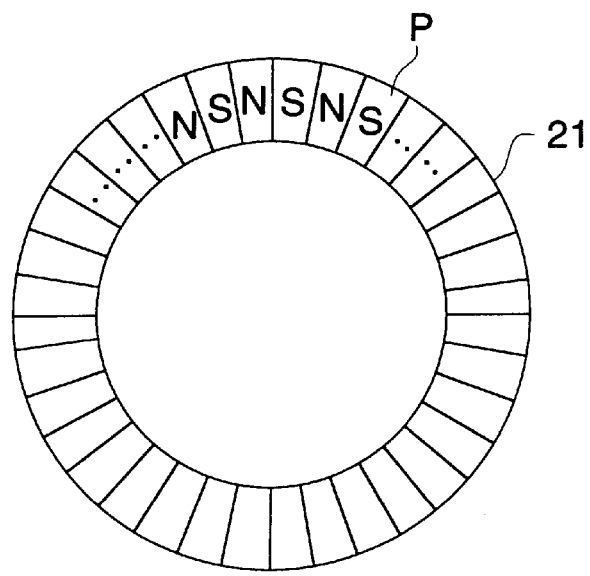
FIG. 3 is a diagram showing a magnetism pattern section of the first embodiment of the invention.

For the magnetism pattern section 21, there is used a rubber magnet that is formed by mixing ferrite powder in a ring-shaped rubber material, for example, wherein plural magnetic poles P are arranged at regular intervals in the rotary direction as shown in FIG. 3. On this magnetism pattern section 21, there is provided an unillustrated pin hole that is for determining the position for mounting the magnetism pattern section on the drum flange 12. Incidentally, the magnetism pattern section 21 may also employ the one formed by coating a magnetic layer on the drum flange 12 or a plastic magnet formed by mixing ferrite powder in resins such as nylon.

Figure 4:
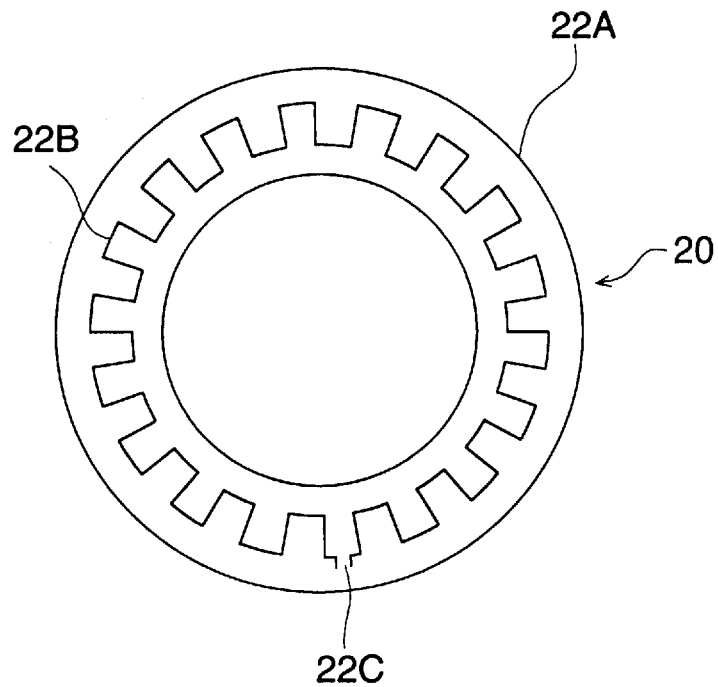
FIG. 4 is a diagram showing an FG pattern section of the first embodiment of the invention.

With regard to the FG pattern section 22, wire circuit of a shape of a circular comb teeth (hereinafter referred to as FG pattern) 22B having recessed portions and projected portions identical in quantity to the poles of the magnetism pattern section 21 is formed on print circuit board (hereinafter referred to as PCB) 22A as shown in FIG. 4, for example, and an unillustrated pin hole that determines the position for fixing on the side plate 13 is provided thereon. To output terminal 22C led from each end of the FG pattern 22B, there is connected an input terminal of the signal processing section 23. Further, PCB 22A is fixed on the side plate 13 through adjusting screw 14 so that a distance from the magnetism pattern section 21 can be adjusted to be constant as shown in FIG. 2. Incidentally, it is also possible to use, for example, a flexible pattern covered with resins such as polyamide for the FG pattern section 22, in addition to PCB. Furthermore, positioning of PCB 22A can also be performed by fitting between a bearing section for the drum shaft on the side plate 13 and an inner circumference of PCB 22A, for example, in addition to the pin hole mentioned above. Incidentally, detailed explanation of the detection of the number of rotations by the use of the FG pattern is omitted here, because it is a known technology.

The signal processing section 23 is composed of signal amplifier circuit 23A that amplifies minute voltage signals generated by the FG pattern 22B described later and outputs sine waves and of waveform forming circuit 23B employing a Schmitt trigger or a comparator, for example, which conducts waveform forming from the amplified sine wave signals and adjusts a phase therefor to output a square wave.

Next, operations in the first embodiment will be explained as follows.

When an electrophotographic apparatus operates, driving force is generated by driving motor M. The driving force is transmitted to drum shaft 11 through a drive transmitting system to rotate photoreceptor drum 10. When the photoreceptor drum 10 rotates, magnetism pattern section 21 fixed on drum flange 12 rotates similarly to how the photoreceptor drum 10 rotates. When the magnetism pattern section 21 rotates, a magnetic field of the magnetism pattern section 21 and FG pattern 22B cross each other on FG pattern section 22 fixed on side plate 13 to produce an induced electromotive force, whereby a minute voltage signal is generated on output terminal 22C. This voltage signal is a signal of a sine wave which has, for each rotation of the magnetism pattern section 21, the frequency that is a half of the number of magnetic poles. The voltage signal generated by the FG pattern section 22 is amplified by signal amplifier circuit 23A, and is further adjusted in terms of duty ratio in case of need. The signals outputted from the signal amplifier circuit 23A are formed by waveform forming circuit 23B to a square wave which whose phase is adjusted. Thus, signals of square waves corresponding to how the photoreceptor drum 10 rotates are outputted from the signal processing section 23. On control section 30, when the number of rotations of the photoreceptor drum 10 is different from a prescribed number of rotations, output signals of the signal processing section 23 are amplified in terms of electric power, and the control signals which control how the driving motor M is driven and thereby cause the number of rotations of the photoreceptor drum 10 to agree with a prescribed number of rotations, are outputted to the driving motor M. On the driving motor M, the driving force is adjusted in accordance with the control signals, and the photoreceptor drum 10 is adjusted in terms of state of rotation.

As stated above, in the first embodiment wherein the state of rotation of the photoreceptor drum 10 is detected by rotation detector 20, it is possible to detect the state of rotation of the photoreceptor drum 10 more accurately due to its detection method which is of a type of all-round integration without being influenced by external disturbance such as vibration or eccentricity, compared with a conventional rotation detector by means of an optical encoder. It is further possible to realize an apparatus wherein photoreceptor drum 10 is driven at a higher rotation accuracy for less speed unevenness, by feeding the state of rotation detected by rotation detector 20 provided on the photoreceptor drum 10 back to driving motor M and thereby by controlling the rotation of the photoreceptor drum 10. In addition, by using rotation detector 20 which is of a thin and simple type, it is possible to provide a small-sized (in the direction of a drum shaft, in particular) and inexpensive apparatus. It is further possible, due to FG pattern section 22 fixed on side plate 13 through adjusting screw 14, to adjust easily the clearance between magnetism pattern section 21 and FG pattern section 22 and thereby to improve maintainability. Due to the structure wherein projected portion 12A is provided on drum flange 12 to prevent penetration of external electromagnetic field, mixing of electromagnetic noise is reduced and stable control can be done, and it is possible to prevent that a magnetism pattern section is demagnetized in process of time by a strong electromagnetic field caused by a charger or the like.

Next, the second embodiment of the invention will be explained as follows.

The second embodiment is represented by the first embodiment wherein signal processing circuit 23 of rotation detector 20 is provided on PCB 23A or FG pattern section 22. Structures other than the foregoing are the same as those in the first embodiment. Therefore, the portions which are different from the first embodiment will be explained, and structures and operations of the same portions are omitted here.

Figure 5:
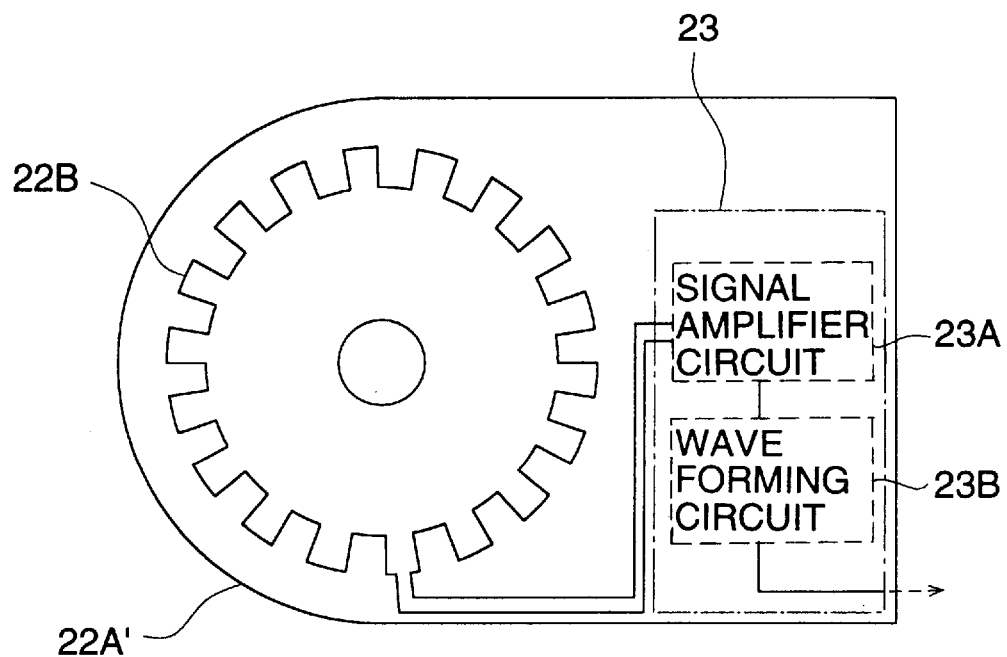
FIG. 5 is a diagram showing an FG pattern section and a signal processing section in the second embodiment of the invention.

FIG. 5 is a diagram showing FG pattern section 22 and signal processing circuit 23 in the second embodiment. However, portions identical to those in the first embodiment are given the same symbols.

In FIG. 5, FG pattern 22A identical to that in the first embodiment and signal processing circuit 23 are formed on PCB 22A' wherein an additional circuit section is provided in PCB 22A in the first embodiment. An output terminal led from the FG pattern 22A is connected to an input terminal of signal amplifier section 23A of signal processing circuit 23. An output of waveform forming section 23B is inputted into control section 30 outside the PCB 22A'.

As stated above, in the second embodiment wherein signal processing circuit 23 is provided on PCB 23A' of FG pattern section 22, it is possible to make the apparatus small in addition to the effect of the first embodiment.

Next, the third embodiment of the invention will be explained as follows.

Figure 6:
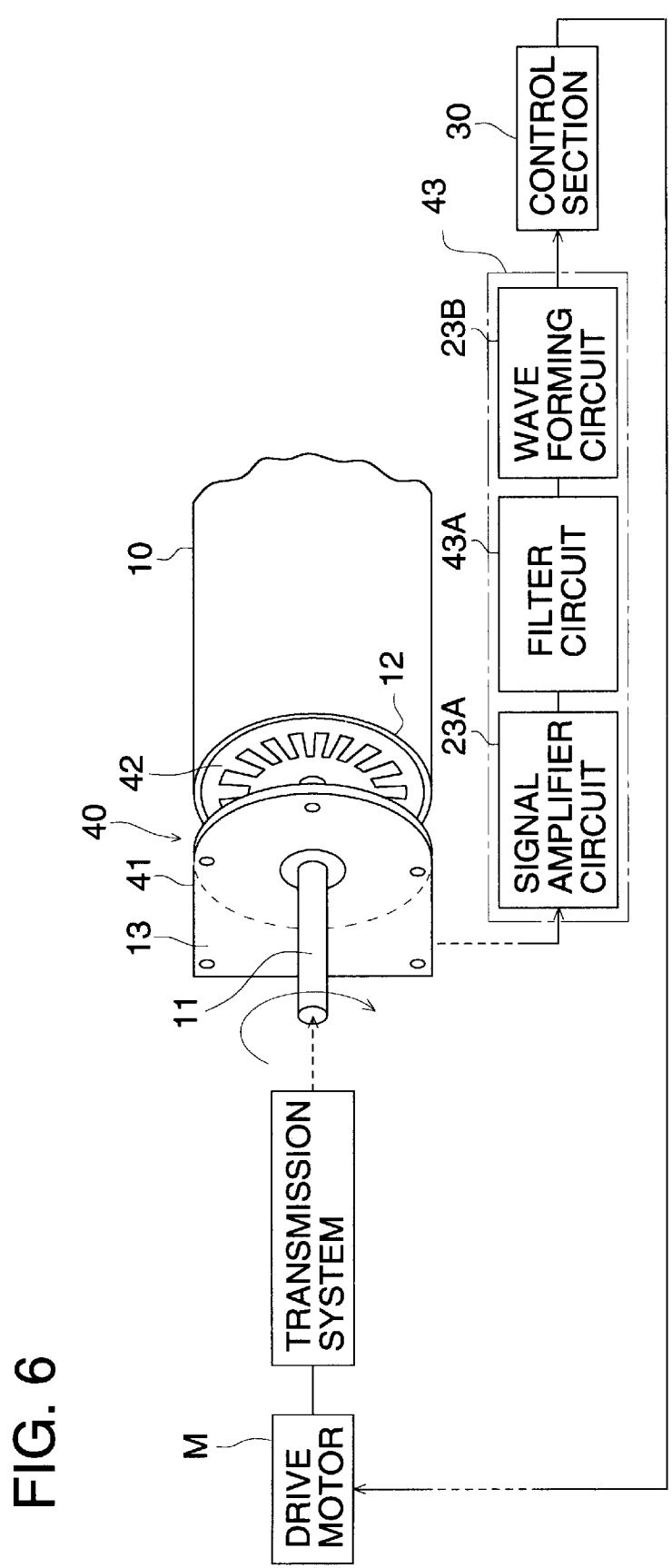
FIG. 6 is a diagram showing the schematic structure of the third embodiment of the invention.

FIG. 6 is a diagram showing the schematic structure of the third embodiment, in which the portions identical to those in the first embodiment are given the same symbols as in the first embodiment.

In FIG. 6, a difference in terms of structure between the third embodiment and the first embodiment is that rotation detector 40 is employed in place of rotation detector 20. The rotation detecting section 40 is composed of magnetism pattern section 41, FG pattern section 42 and signal processing section 43.

In the magnetism pattern section 41, a circumference-shaped rubber magnet in which plural magnetic poles P are magnetized at regular intervals in the same manner as in the magnetism pattern section 21 shown in aforesaid FIG. 3 is fixed on side plate 13 concentrically with drum shaft 11 through an adjusting screw (at the same fixing position as in FG pattern section 22 in the first embodiment).

Figure 7:
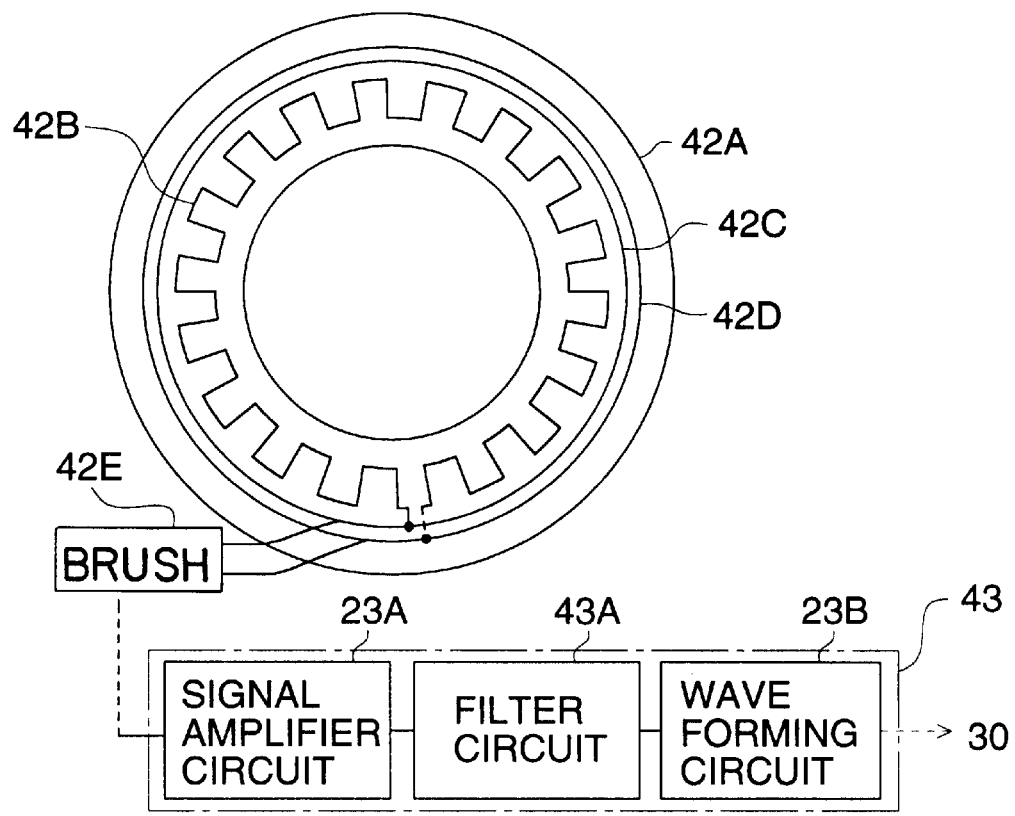
FIG. 7 is a diagram showing an FG pattern section and a signal processing section in the third embodiment of the invention.

In the FG pattern section 42, FG pattern 42B which is the same as FG pattern 22B in the first embodiment is formed on PCB 42A as shown in FIG. 7. One end of the FG pattern 42B is connected to circular signal wire 42C formed on an outer circumferential portion of PCB 42A, while the other end thereof is connected to circular signal wire 42D formed on the outer side of signal wire 22C through the reverse side of PCB 42A. The PCB 42A is fixed on the outer side of drum flange 12 concentrically with drum shaft 11 (at the same fixing position as in magnetism pattern section 21 in the first embodiment). Signals generated on the FG pattern 42B are sent to signal processing section 43 on the outer side of PCB 42A through brush 42E which slides on signal wires 42C and 42D.

Figure 8:
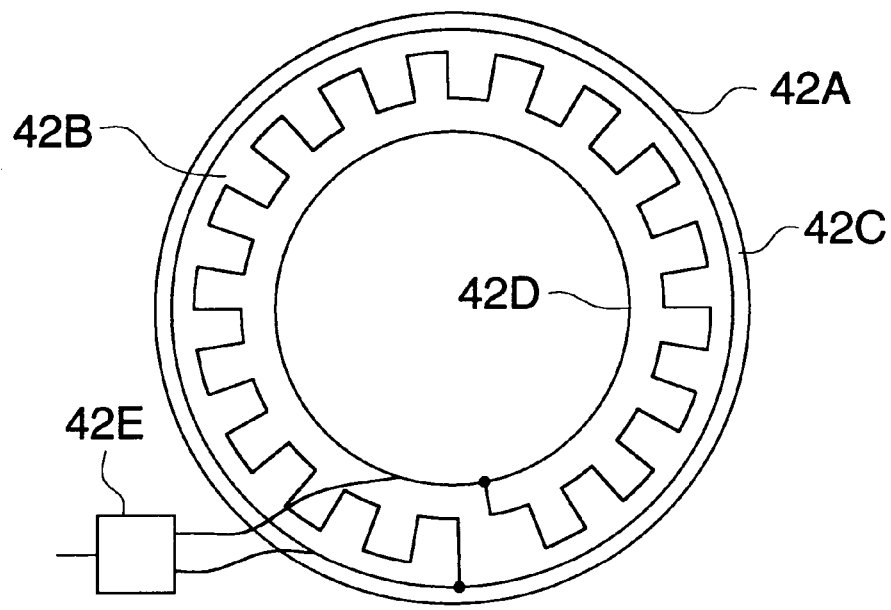
FIGS. 8(a) and 8(b) are diagrams showing an example of another FG pattern section.
Figure 8:
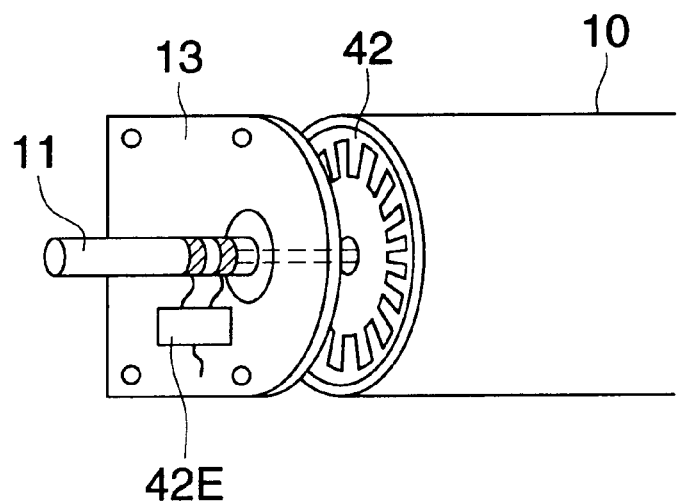

Incidentally, wiring positions for the signal wires 42C and 42D of the FG pattern section 42 are not limited to the above-mentioned positions, and signal wire 42D' may also be arranged inside the FG pattern 42B, for example, as shown in FIG. 8(A). In this case, a position of a signal wire that is closer to the center of rotation results in slower linear speed which has an effect of less wear of brush 42E. Or, it is also possible to employ an arrangement wherein both ends of the FG pattern 42B are extended to output terminals formed on the outer circumferential portion of drum shaft 11 through its inside as shown in FIG. 8(B), and brush 42E slides on the output terminals. Further, the output terminals may also be provided between side plate 13 and FG pattern section.42, though they are located at the place that is closer to driving motor M than side plate 13 in FIG. 8(B).

As shown in FIG. 7, the signal processing section 43 is composed of signal amplifier circuit 23A and waveform forming circuit 23B both being the same as in the first embodiment, and of filter circuit 43A serving as a noise eliminating section interposed between aforesaid two circuits. For filter circuit 43A, a low pass filter, for example, is used for it because it eliminates noise caused by the brush 42E.

Structures other than the foregoing are the same as those in the first embodiment, and explanation therefor will be omitted accordingly.

Next, operations of the third embodiment will be explained as follows.

When the apparatus operates, driving motor M is driven to rotate photoreceptor drum 10. As the photoreceptor drum 10 rotates, FG pattern section 42 fixed on drum flange 12 rotates in the same state of rotation as in the photoreceptor drum 10. When the FG pattern section 42 rotates, a magnetic field of magnetism pattern section 41 fixed on side plate 13 and FG pattern 42B cross each other, and minute voltage signal is generated on FG pattern 42B in the same manner as in the first embodiment. This voltage signal is inputted in signal amplifier circuit 23A through signal wires 42C, 42D and brush 42E. In this case, when the brush 42E generates noise, a noise component is superimposed on the voltage signal. In the signal amplifier circuit 23A, inputted signal is amplified, and duty ratio is adjusted when necessary. With regard to output signal of the signal amplifier circuit 23A, its noise component generated by the brush 42E is eliminated by the filter circuit 43A. Output signal of the filter circuit 43A is formed by waveform forming circuit 23B to a square wave whose phase is then adjusted. Signals of the square wave are outputted from signal processing section 43 to control section 30, thus, driving motor M is controlled and thereby the rotation of the photoreceptor drum 10 is corrected in the same manner as in the first embodiment.

As stated above, even in the third embodiment wherein FG pattern section 42 is rotated together with photoreceptor drum 10 and magnetism pattern section 41 is fixed on the photoreceptor drum 10, the state of rotation of the photoreceptor drum 10 can be detected accurately and rotation of the photoreceptor drum 10 can be controlled on a highly accurate basis. In addition, owing to the filter circuit 43A provided, the state of rotation of the photoreceptor drum 10 can be detected surely without being influenced by the noise caused by brush 42E.

Incidentally, signal processing section 43 can also be provided on PCB 42A in the same way as in the second embodiment. In this case, output signals of FG pattern 42B are inputted directly into the signal processing section. A power supply terminal and an output terminal for each circuit of the signal processing circuit 43 are connected to outer circuits through brushes.

Next, the fourth embodiment of the invention will be explained as follows.

The fourth embodiment wherein a rotation detector is provided on the circumferential portion of a photoreceptor drum of an electrophotographic apparatus will be explained.

Figure 9:
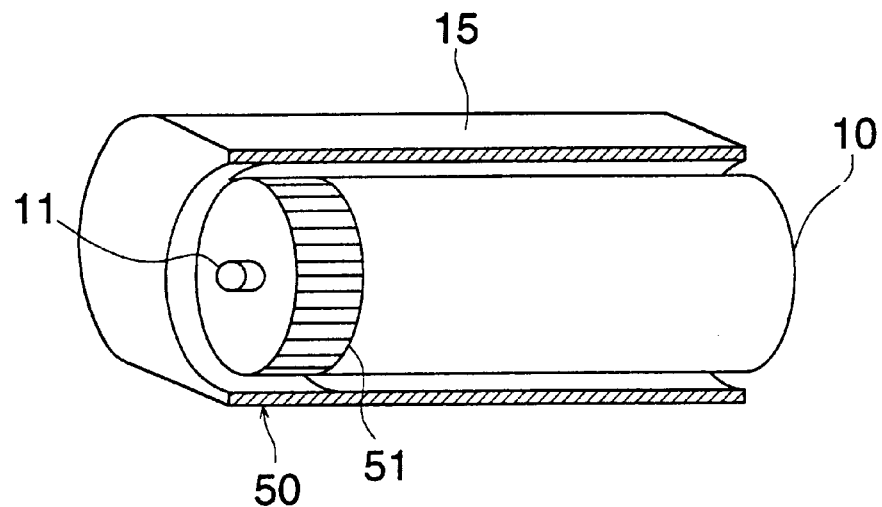
FIG. 9 is a diagram showing the schematic structure of the fourth embodiment of the invention.

FIG. 9 is a diagram showing the schematic structure of the fourth embodiment, wherein only the portions in the vicinity of a photoreceptor drum and a drum cartridge are shown. Portions identical to those in the first embodiment are given the same symbols as in the first embodiment.

In FIG. 9, a difference in terms of structure between the fourth embodiment and the first embodiment is that magnetism pattern section 51 of rotation detector 50 is provided on the side of an outer circumference of photoreceptor drum 10 and FG pattern section 52 is provided on drum cartridge 15.

The magnetism pattern section 51 is a ring-shaped rubber magnet on which plural magnetic poles are magnetized at regular intervals, and it is fixed on the entire side of an outer circumference of the photoreceptor drum 10. Incidentally, the magnetism pattern section 21 is not limited to a rubber magnet, and it may also be the one formed by coating a magnetic layer on the side of an outer circumference of the photoreceptor drum 10 or on the flange surface through an insulating layer, for example. In this case, a thickness in the radial direction of a drum can be reduced, resulting in an effect that processing accuracy in forming magnetism pattern section 51 on the photoreceptor drum 10 can be improved.

Figure 10:
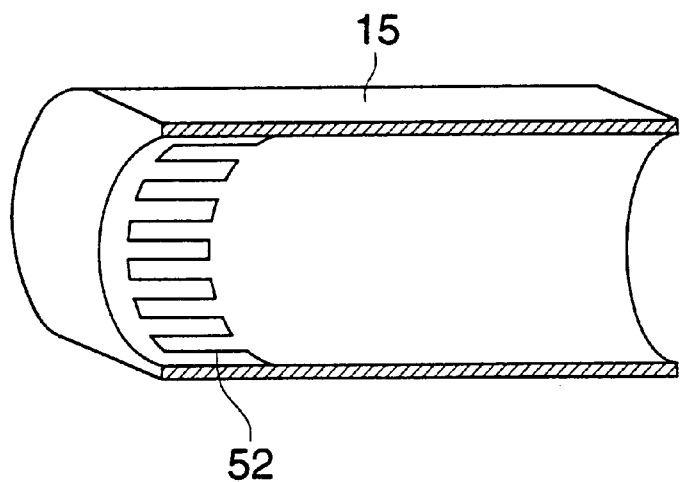
FIG. 10 is a diagram showing a drum cartridge in the fourth embodiment of the invention.

In the FG pattern section 52, FG pattern is formed on the side of drum cartridge 15 which faces magnetism pattern section 51 as shown in FIG. 10, provided, however that the drum cartridge is of a shape to surround the entire circumference of the photoreceptor drum 10 and FG pattern is formed to cover entire circumference of the drum cartridge 15, only a partial section of which is shown in FIG. 10.

Structures in the fourth embodiment other than the foregoing are the same as those in the first embodiment, and explanation thereof will be omitted accordingly.

As stated above, in the fourth embodiment wherein magnetism pattern section 51 is provided on the side of an outer circumference of photoreceptor drum 10 and FG pattern section 52 is provided on drum cartridge 15, it is possible to keep the clearance between the magnetism pattern section 51 and FG pattern section 52 constant, which results in easy maintenance of an apparatus, in addition to the effect of the first embodiment.

Figure 11:
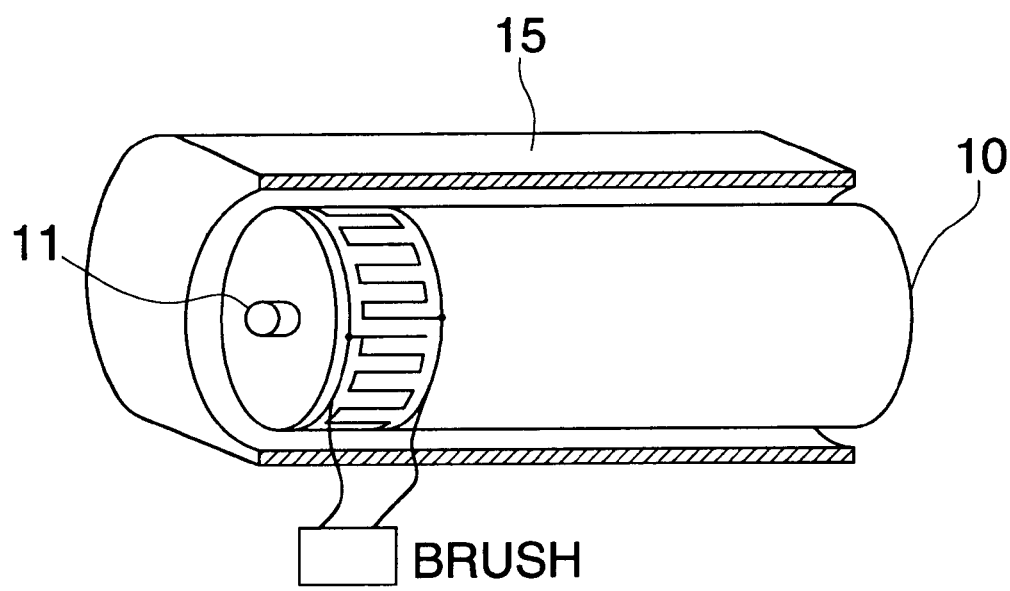
FIG. 11 is a diagram showing an example wherein an FG pattern section is arranged on the outer side of a photoreceptor drum.

Incidentally, in the same manner as in the third embodiment, it is also possible to employ an arrangement wherein an FG pattern section is provided on a photoreceptor drum and a magnetism pattern section is provided on a drum cartridge, by switching the arrangement of the magnetism pattern section and the FG pattern section in the fourth embodiment. In this case, the FG pattern section can be represented by a flexible pattern covered with resins such as polyamide, for example, and signals generated on the FG pattern are outputted through a brush as shown in FIG. 11.

In the first embodiment through the third embodiment described above, the magnetism pattern section or the FG pattern section is provided on the drum flange. However, when a fly wheel is provided on a drum shaft for stabilizing the rotation of a photoreceptor drum, for example, the magnetism pattern section or the FG pattern can also be provided on the fly wheel in place of the drum flange.

In addition, in the first embodiment through the fourth embodiment described above, the portion to be fixed (FG pattern section or magnetism pattern section) for rotation in the rotation detector is provided to cover the entire circumference of a rotating body. However, to make the rotation detection to be of a type of integration for entire circumference, at least a half circumference of a rotating body has only to be provided with FG pattern, and FG pattern provided on three fourths of an entire circumference can reduce effectively an influence of the outer disturbance.

Furthermore, in the first embodiment through the fourth embodiment described above, an explanation was made for the occasion wherein the rotation of a photoreceptor drum of an electrophotographic apparatus was controlled. However, the invention is not limited to this, and it is also possible to apply the invention in the occasion wherein the state of rotation of a rotating body rotated by a driving means, such as a roller of a belt-shaped photoreceptor or a ball screw for sub-scanning driving (drum, roller), for example, is detected directly to be controlled, and application of the invention to an apparatus requiring high accuracy for sub-scanning such as an imager for medical use, direct digitizer and a scanner is especially effective.

Next, an embodiment of a rotation detecting unit wherein FG pattern is multiplied will be explained as follows.

In the fifth embodiment, an occasion wherein a rotation detecting unit of the invention is applied for detection of the state of rotation of a motor that drives a roller for sub-scanning such as an image for medical use, for example, will be explained.

Figure 13:
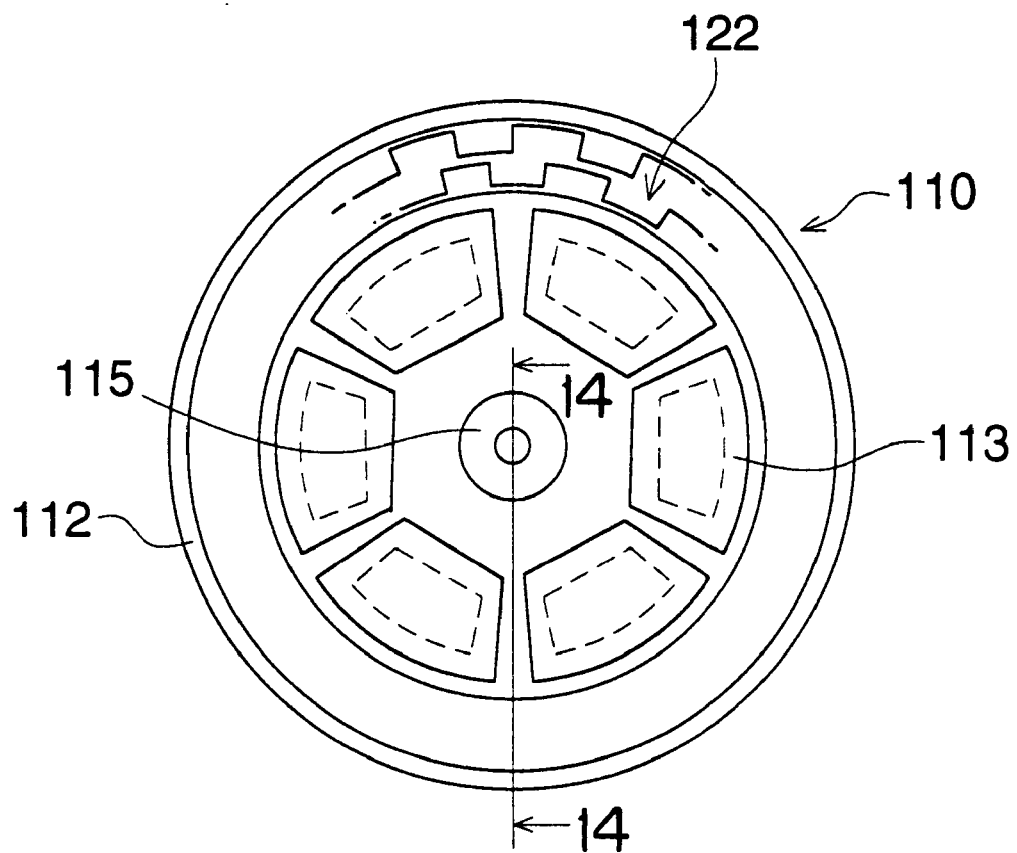
FIG. 13 is a sectional view of a motor in the fifth embodiment of the invention.
Figure 14:
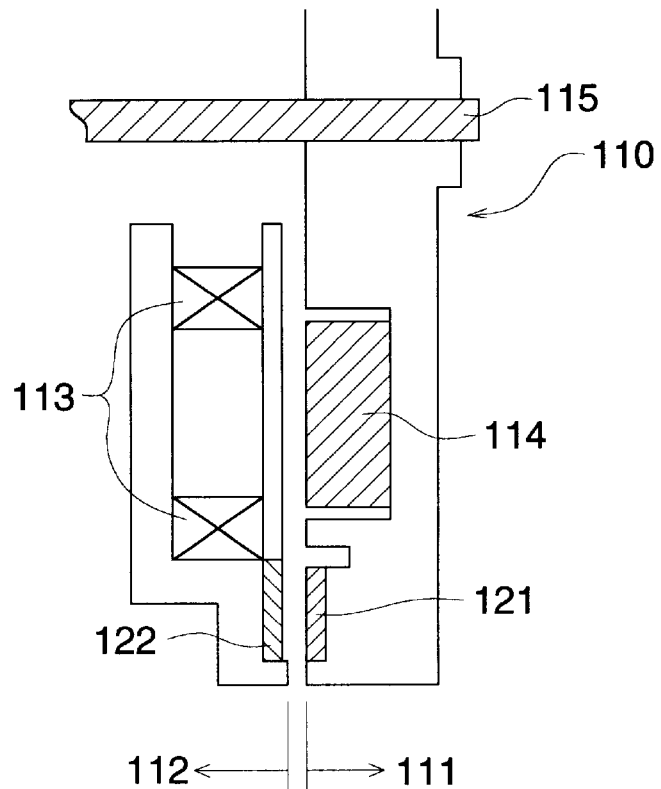
FIG. 14 is a sectional view taken on line 14—14 in FIG. 13.
Figure 15:
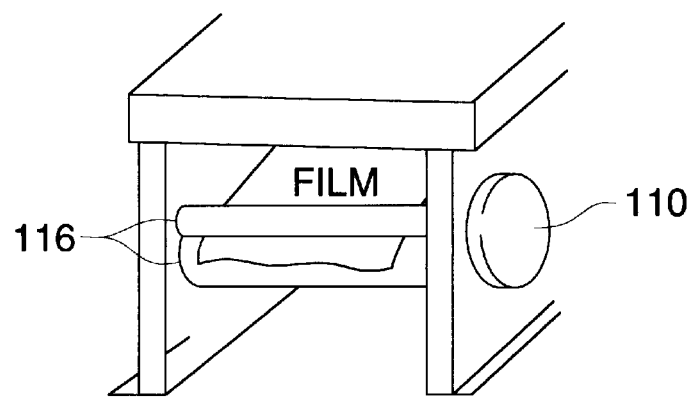
FIG. 15 is a schematic structural diagram of an imager for medical use in the fifth embodiment of the invention.

FIG. 13 is a sectional view of a motor equipped with a rotation detecting unit of the first embodiment, and FIG. 14 is a sectional view taken on line 14—14 in FIG. 13. FIG. 15 is a schematic structural diagram of a sub-scanning section of an image for medical use.

In FIGS. 13 and 14, the unit is composed of magnetism pattern section 121 fixed on an outer circumferential portion of rotating yoke section 111 of motor 110, FG pattern section 122 fixed on stator section 112 of motor 110 facing the magnetism pattern section 121 to be away therefrom by a certain distance, and unillustrated signal processing section 123 serving as a signal processing means that processes signals generated from the FG pattern section 122.

As the motor 110, there is used a direct drive motor (DD motor) identical to that used for a conventional imager for medical use, for example. In this motor 110, when drive coil 113 provided on the stator section 112 is rotated, the yoke section 111 provided with drive magnet 114 rotates around the center of motor shaft 115, as shown in FIG. 14. As shown in FIG. 15, the motor shaft 115 is connected with sub-scanning roller 116 which rotates to convey a film.

Figure 16:
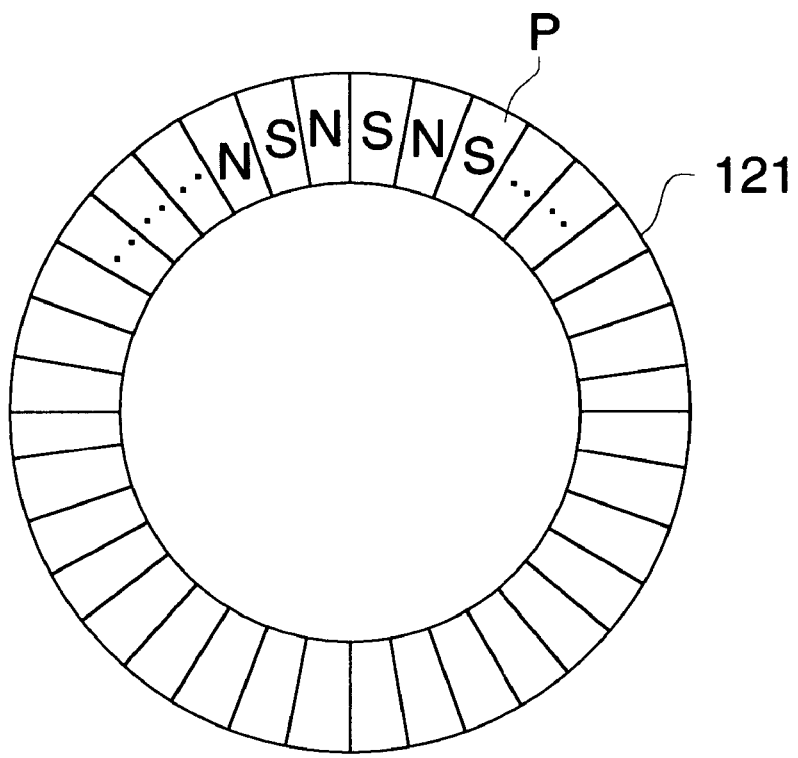
FIG. 16 is a diagram showing a magnetism pattern section of the fifth embodiment of the invention.

For the magnetism pattern section 21, there is used a rubber magnet that is formed by mixing ferrite powder in a ring-shaped rubber material, for example, wherein plural magnetic poles P are arranged at regular intervals in the rotary direction and are shaped so as to obtain the magnetic field substantially equal in the radial direction as shown in FIG. 16. The number of magnetic poles in this case corresponds to the number of the number of recessed portions and projected portions in an FG pattern. However, the number of magnetic poles may also be greater than the number of recessed portions and projected portions in an FG pattern.

This magnetism pattern section 121 is fixed on an outer circumferential portion of the yoke section 111. Incidentally, for the magnetism pattern section 121, the one formed by coating a magnetic layer on the yoke section 111, or a plastic magnet formed by mixing ferrite powder in resins such as nylon may also be used.

The FG pattern section 122 is formed in a way that two FG patterns $122B_1$ and $122B_2$ each having different radius and the same center position are arranged to be deviated in terms of phase by 90° on the same plane of print circuit board (hereinafter referred to as PCB) 22A as shown in FIG. 17, for example. Each of the FG patterns $122B_1$ and $122B_2$ is a wire circuit in a shape of a circular comb teeth having a pattern of recessed portions and projected portions in quantity identical to the number of poles of magnetism pattern section 21. In this case, with regard to the phase mentioned above, a phase of a pattern of a pair of recessed portion and projected portion of FG pattern is considered to be 360°. PCB 122A is fixed on stator section 112 which faces magnetism pattern section 121 to be away therefrom by a certain distance as shown in FIG. 14. Signals generated from each of FG patterns $122B_1$ and $122B_2$ are outputted from an output terminal that is derived from each of both ends of the FG patterns $122B_1$ and $122B_2$. Each output terminal is connected to an input terminal of signal processing section 123.

Signal processing section 123 is composed of signal amplifier circuit 123A, waveform forming circuit 123B, and of multiplication circuit 123C which calculates exclusive OR, for example, for multiplying original signals. The signal amplifier circuit 123A amplifies minute voltage signal generated from each of FG patterns $22B_1$ and $22B_2$, and outputs a sine wave. The waveform forming circuit 123B eliminates high frequency noise components from amplified sine wave signals by using, for example, a Schmitt trigger or a comparator, and compares them with unillustrated prescribed threshold value, thus forms a waveform and outputs a square wave. The multiplication circuit 123C obtains exclusive OR of each signal outputted from the waveform forming circuit 123B, then composes two signals and generates signals of multiplication frequency.

The signals of multiplication frequency are sent to the unillustrated control section as a result of detection made by the rotation detector, and the control section controls drive coil 113 of motor 110 in terms of driving based on the result of detection.

Incidentally, for the input to the control section, it is also possible to use an output of the waveform forming circuit 123B without using the multiplication circuit 123C as shown with broken lines in FIG. 17. Further, for the FG pattern, an operating conductor stated later may also be structured on the same plane on a film-shaped flexible board.

Next, operations of the fifth embodiment will be explained as follows.

When an imager for medical use operates, drive coil 113 of motor 110 is driven and yoke section 111 rotates. Being caused by this rotation of the yoke section 111, magnetism pattern section 121 fixed on the yoke section 111 rotates. Being caused by this rotation of the magnetism pattern section 121, a magnetic field of the magnetism pattern section 121 and FG patterns $122B_1$ and $122B_2$ cross each other on FG pattern section 122 fixed on stator section 112 to produce an induced electromotive force. Owing to the induced electromotive force, a minute voltage signal is generated on an output terminal of FG pattern $122B_1$ and a minute voltage signal whose phase is deviated by 90° from the voltage signal generated at the FG pattern 122B$_1$ and whose amplitude is almost the same as that in that voltage signal is generated on an output of the FG pattern 122B$_2$. Each voltage signal is a signal of a sine wave which has, for each rotation of the magnetism pattern section 121, the frequency that is a half of the number of magnetic poles. FIG. 18(a) shows a waveform of an output signal of the FG pattern section 122. The voltage signal generated by the FG pattern section 122 is amplified by signal amplifier circuit 123A, and is further adjusted in terms of duty ratio in case of need. When a comparator is used, for example, in the waveform forming circuit 123B, when each output signal of the amplifier circuit 123A exceeds a threshold value established at a prescribed level, signals at high level are outputted and two square waves each being different each other in terms of phase by 90° are formed. FIG. 18(b) shows a waveform of an output signal of the waveform forming circuit 123B. These two square waves are composed by multiplication circuit 123C, whereby voltage signals having the doubled multiplication frequency are generated. FIG. 18(c) shows output signal waveforms of the multiplication circuit 123C. These signals of multiplication frequency are sent to the control section, thus, square wave signals having the multiplication frequency depending on the state of rotation of the motor 110 are outputted from signal processing section 123. Based on this output signal of the signal processing section 123, drive coil 113 is controlled in the control section and thereby the rotation of motor 110 is controlled.

As stated above, in the fifth embodiment wherein FG patterns 122B$_1$ and 122B$_2$ each being different in terms of radius are formed doubly on the same plane of PCB 122A to be deviated by 90° in terms of phase and thereby a distance between magnetism pattern section 121 and FG pattern 122B$_1$ and that between magnetism pattern section 121 and FG pattern 122B$_2$ are the same, an amplitude of a signal generated in accordance with the state of rotation of the motor 110 at FG pattern 122B$_1$ and that of a signal generated in accordance with the state of rotation of the motor 110 at FG pattern 122B$_2$ are mostly the same, and the number of pulses of detection signals can be doubled compared with the number of pulses where FG pattern is made singly. It is therefore possible to generate surely detection signals having a large number of pulses, and thereby the state of rotation of motor 110 can be detected at high accuracy. In addition, when comparing with conventional rotation detection by means of an optical encoder, the state of rotation of motor 110 can be detected accurately without being influenced by external disturbance such as a vibration, because a detection method by means of magnetic pattern section 121 and FG pattern section 122 is of a type of whole circumference integral.

Next, the sixth embodiment of the invention will be explained as follows.

The sixth embodiment wherein FG patterns are further multiplied in the radial direction to form 4-fold FG patterns in the fifth embodiment will be explained.

A difference between the sixth embodiment and the fifth embodiment in terms of structure is that FG pattern section 132 is used in place of FG pattern section 122. Other structures in the sixth embodiment are the same as those in the fifth embodiment, and explanation therefor are omitted accordingly.

FIG. 19 shows an enlarged diagram of FG pattern section 132 in the sixth embodiment.

In FIG. 19, with regard to the FG pattern section 132, 4 FG patterns 132B$_1$, 132B$_2$, 132B$_3$ and 132B$_4$ each being of a shape of circular comb teeth and having a different radius and having recessed portions and projected portions identical in quantity to the poles of the magnetism pattern section 121 are formed on the same plane of PCB 132A with their centers located at the same position. Further, these FG patterns adjacent to each other are arranged so that their phases are staggered respectively by 45(=180/4)°. In addition, with regard to these FG patterns 132B$_1$–132B$_4$, a length of an operating conductor crossing respectively with a magnetic field of magnetism pattern section 121, namely a length of a wire circuit in the radial direction (that is in parallel with a magnetic pole of magnetism pattern section 121) out of a wire circuit in a shape of a circular comb teeth, is set to be almost the same each other. This FG pattern section 132 is fixed on stator section 112 that faces magnetism pattern section 121 to be away therefrom by a constant distance, as in the fifth embodiment. Signals generated from each of FG patterns 132B$_1$–132B$_4$ are outputted from an unillustrated output terminal led from both ends of each of FG patterns 132B$_1$–132B$_4$ and sent to an input terminal of signal processing section 123.

Next, operations of the sixth embodiment will be explained as follows.

In the same way as in the first embodiment, when an imager for medical use operates, magnetism pattern section 121 rotates together with yoke section 111 of motor 110. Owing to the rotation of the magnetism pattern section 121, a magnetic field of the magnetism pattern section 121 and FG patterns 132B$_1$–132B$_4$ cross each other and whereby, an induced electromotive force is produced on FG pattern section 132 fixed on stator section 112. Owing to the induced electromotive force, a minute voltage signal having a different phase is generated on an output terminal of each of the FG patterns 132B$_1$–132B$_4$. A difference of a phase between the adjacent patterns is 45(=180/4)°. Each voltage signal is a signal of a sine wave that has a frequency being a half of the number of poles for each rotation of the magnetism pattern section 121, and it is a signal that has a signal amplitude that is mostly the same as others because of a length of an operating conductor that is almost the same each other. Each voltage signal generated at each of FG patterns 132B$_1$–132B$_4$ is amplified by signal amplifier circuit 123A as in the first embodiment, and its duty ratio is adjusted when necessary. When each output signal of the signal amplifier circuit 123A is exceeds a prescribed threshold value at waveform forming circuit 123B, there are outputted high level signals which are formed to be 4 square waves each being staggered in terms of phase by 45°. Then, these 4 square waves are composed by multiplication circuit 123C, and thereby voltage signals having multiplication frequency that is quadrupled frequency are generated.

Now, operations of the multiplication circuit 123C which calculate an exclusive OR in the same way as in the fifth embodiment will be explained concretely as follows, referring to FIG. 20.

FIG. 20(A) shows a signal waveform that is formed after voltage signals generated at each of FG patterns 132B$_1$–132B$_4$ are formed to a square wave by waveform forming circuit 123B. In this case, FG pattern 132B$_1$ is considered to be a standard phase. A phase of a signal waveform for each of pattern 132B$_2$, pattern 132B$_3$ and pattern 132B$_4$ is staggered respectively by 45° against the standard phase. In the multiplication circuit 123C, an exclusive OR of the standard phase signals and that of the pattern 132B$_2$ signals are obtained, and two signals are composed. FIG. 20(B) shows a composed signal waveform wherein signals of the standard phase and signals of the pattern $132B_2$ are composed. Then, composed signals and signals of the pattern $132B_3$ are composed in the same way. FIG. 20(C) shows a signal waveform wherein signals of the pattern $132B_3$ are composed. Furthermore, the composed signals and signals of the pattern $132B_4$ are composed in the same way. FIG. 20(D) shows a signal waveform wherein signals of the pattern $132B_4$ are composed. By composing signals of FG pattern $132B_1$ phase—FG pattern $132B_4$ phase in succession as in the foregoing, signals having multiplication frequency that is four times that of the signal of the standard phase are generated. Incidentally, with regard to a method to compose four square waves, it is also possible to employ, in addition to the method mentioned above, another method, for example, wherein signals of the pattern $132B_1$ phase (standard phase) and signals of the pattern $132B_2$ phase are composed and signals of the pattern $132B_3$ phase and signals of the pattern $132B_4$ phase are composed, and respective signals thus composed are further composed so that quadrupled multiplication frequency signals may be generated.

These quadrupled multiplication frequency signals are sent from signal processing section 123 to a control section as a result of detection of a rotation detector. Based on this result of detection, the control section controls drive coil 113, and thus the rotation of motor 110 is controlled.

As stated above, in the sixth embodiment, when the FG patterns $132B_1$–$132B_4$ are formed on a 4-fold basis by shifting a phase by 45° on the same plane of PCB 132A, it is possible to quadruple the number of pulses of the detection signals wherein four signals are composed, compared with the number of pulses in which FG patterns are formed on a single-fold basis. Accordingly, it is possible to detect the state of rotation of motor 110 with a higher precision based on detection signals having the greater number of pulses. Further, under the substantially equal magnetic flux, owing to the length of an operating conductor portion of each of the FG patterns $132B_1$–$132B_4$ which is made to be mostly the same each other, an amplitude of a voltage signal generated at each of the FG patterns $132B_1$–$132B_4$ becomes to be more identical each other, thus, detecting accuracies of a rotation detector can further be improved.

Incidentally, in the fifth and sixth embodiments described above, there have been explained about FG patterns formed on a 2-fold or 4-fold basis to which, however, the invention is not limited, and it is possible to form FG patterns in the radial direction on a 3-fold basis or even an n-fold basis by multiplying further. In the case of forming the FG patterns on an n-fold basis, the adjacent FG patterns are arranged so that their phases are staggered respectively by 180°. The maximum frequency of the detection signals in this case is one which is n times that of the signals where FG patterns are formed on a single-fold basis.

Further, in each of the fifth and sixth embodiments, there is employed an arrangement wherein a signal processing section is provided outside a motor. However, it is also possible to employ an arrangement, for example, wherein a signal processing section is provided on a PCB of an FG pattern section in the same manner as in the second embodiment.

In addition to the above, it is also possible to further obtain pulse signals with doubled frequency if a rise and a fall of signals multiplied by a multiplication circuit are utilized. In this case, the number of pulses of detection signals obtained in the arrangement identical to that in the fifth embodiment is one which is four times that of the E signals where FG patterns are formed on a single-fold basis, and the number of pulses of detection signals obtained in the arrangement identical to that in the sixth embodiment is one which is eight times greater.

Furthermore, the direction for shifting against the direction of rotation of a rotating body and the rotary direction of multiplication FG patterns is not limited to the directions shown in the fifth and sixth embodiments, and it can be established freely, and a combination thereof can also be selected freely.

Again, although there was explained an occasion where the rotation of a motor that drives a sub-scanning roller of an imager for medical use is detected in the embodiment described above, the invention is not limited to this; and application to a ball screw for sub-scanning driving or to a roller for sub-scanning driving, for example, is possible, and its application to an apparatus requiring a high precision for sub-scanning such as a direct digitizer for medical use or a scanner for medical use is especially effective.

Next, there will be explained an embodiment wherein FG pattern is multiplied and the rotation of a photoreceptor drum in an electrophotographic apparatus is controlled by the use of a rotation detector capable of detecting a multiplication frequency.

Figure 22:
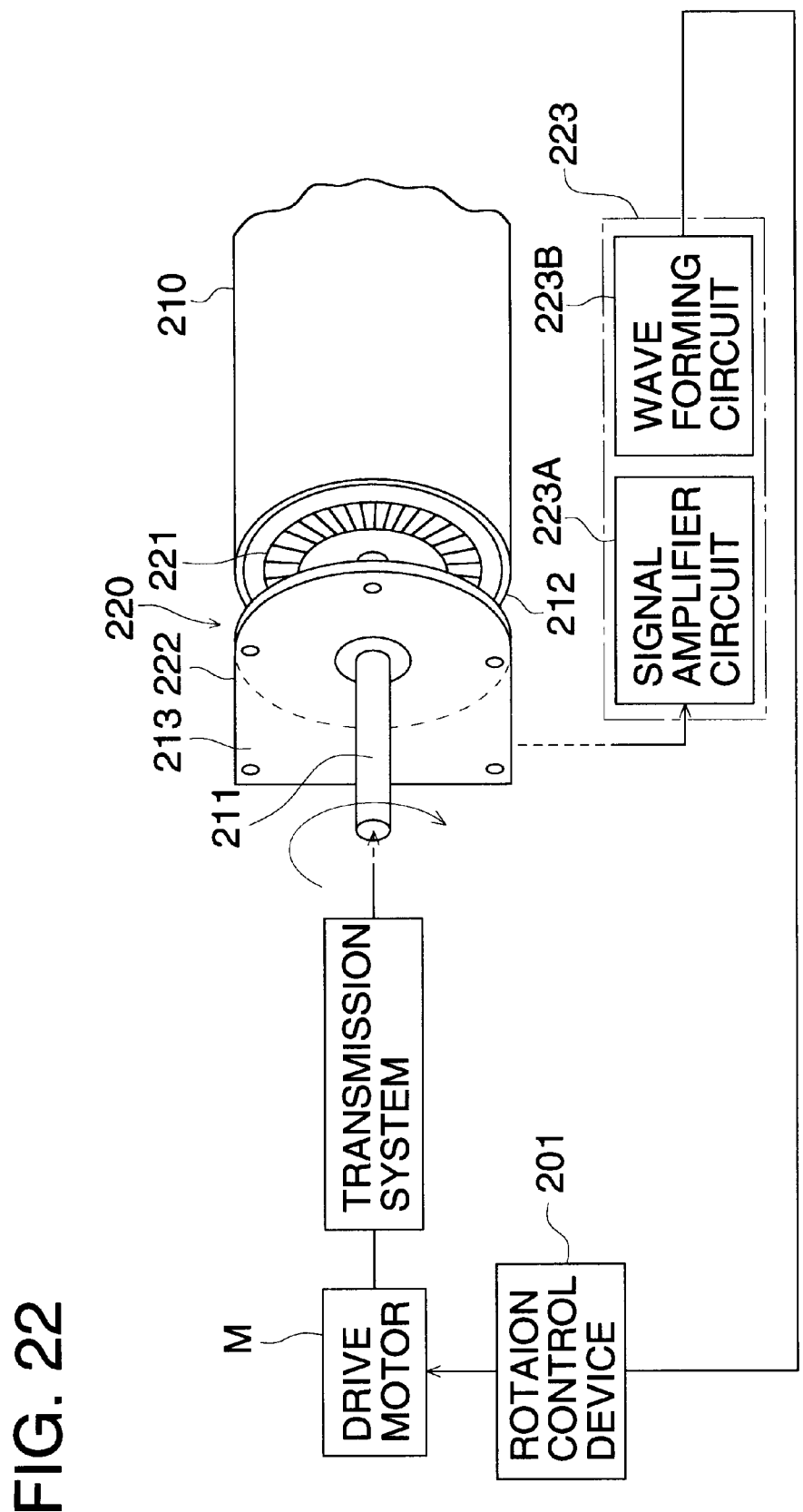
FIG. 22 is a diagram showing the schematic structure of an electrophotographic apparatus in the first embodiment of the invention.

FIG. 22 is a diagram showing the schematic structure of an electrophotographic apparatus in the seventh embodiment.

In FIG. 22, photoreceptor drum 210 of an electrophotographic apparatus is rotated around drum shaft 211 by drive motor M as in FIG. 1, by which an image is recorded or read. Further, rotation detector 220 which detects the state of rotation of the photoreceptor drum 210 is provided on the drum shaft 211.

The photoreceptor drum 210 is, for example, is of a shape of a hollow cylinder, and drum flange 212 is fixed on an end of the cylinder similarly to that shown on a sectional view in FIG. 2, and the drum shaft 211 is fixed at the center of the drum flange 212. Both ends of the drum shaft 211 are supported rotatably in side plates 213 for supporting the drum. The photoreceptor drum 210 is rotated by driving force which is generated by drive motor M and is transmitted to one end of the drum shaft 211.

The rotation detector 220 is composed of magnetism pattern section 221 fixed on the outer side of the drum flange 212 to be concentric with the drum shaft 211, FG pattern section 222 and fixed on the side plate 213 to face the magnetism pattern section 221 with a certain clearance therefrom, and signal processing section 223 that processes signals outputted from the FG pattern section 222.

For the magnetism pattern section 221, there is used a rubber magnet that is formed by mixing ferrite powder in a ring-shaped rubber material, for example, wherein plural magnetic poles P are arranged at regular intervals in the rotary direction as shown in FIG. 3.

Figure 23:
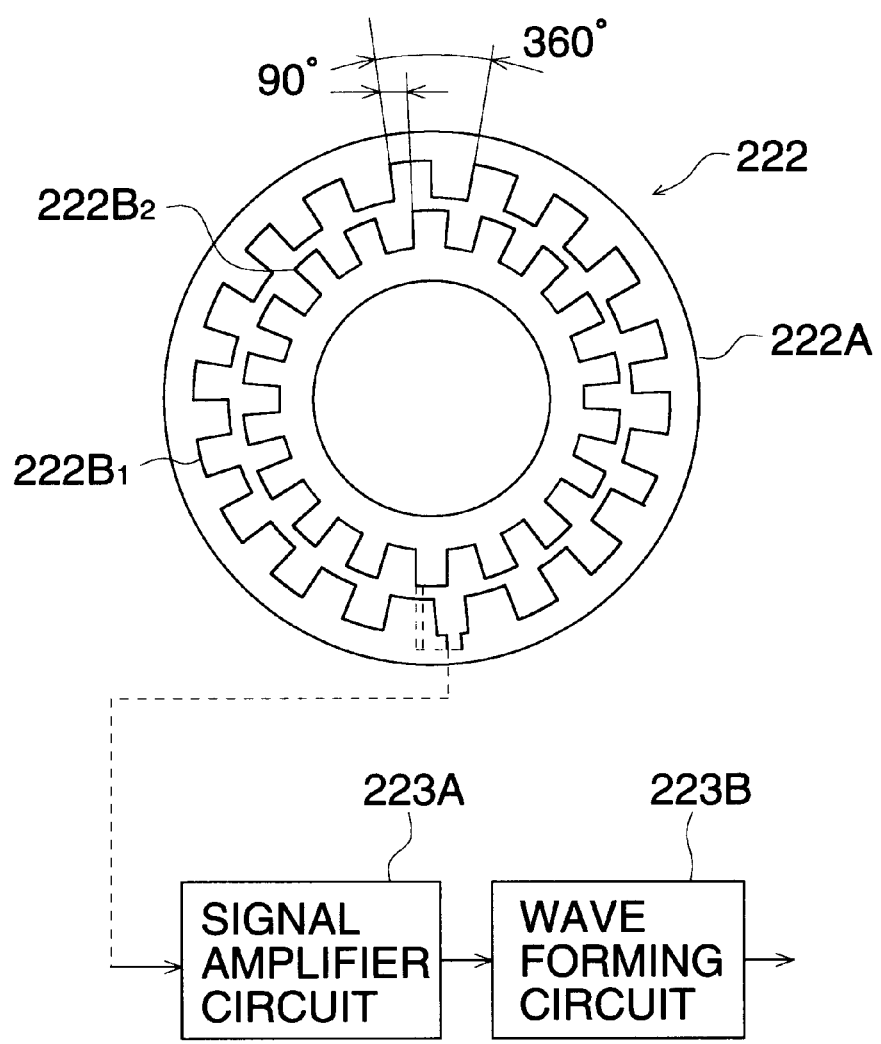
FIG. 23 is a diagram showing an FG pattern section in the first embodiment of the invention.

Unlike the first embodiment, in the present example, The FG pattern section 222 is formed in a way that two FG patterns $222B_1$ and $222B_2$ each having different radius and the same center position are arranged to be deviated in terms of phase by 90° on the same plane of print circuit board 222A as shown in FIG. 23, for example. Each of the FG patterns $222B_1$ and $222B_2$ is a wire circuit in a shape of a circular comb teeth having a pattern of recessed portions and projected portions in quantity identical to the number of poles of magnetism pattern section 221. In this case, with regard to the phase mentioned above, a phase of a pattern of a pair of recessed portion and projected portion of FG pattern is considered to be 360°. The PCB 222A is fixed on side plate 213 through adjusting screws so that the distance between the PCB 222A and magnetism pattern section 221 can be adjusted to be constant. Signals generated from each of FG patterns $222B_1$ and $222B_2$ are outputted from an output terminal that is led from each of both ends of the FG patterns $222B_1$ and $222B_2$. Each output terminal is connected to an input terminal of signal processing section 223.

Signal processing section 223 is composed of signal amplifier circuit 223A and waveform forming circuit 223B. The signal amplifier circuit 223A amplifies minute voltage signal generated from each of FG patterns $222B_1$ and $222B_2$, and outputs a sine wave. The waveform forming circuit 223B wave-forms the amplified sine wave and outputs a square wave.

Now, operations of rotation detector section 220 will be explained as follows.

When an electrophotographic apparatus operates, driving force is generated by driving motor M. The driving force is transmitted to drum shaft 211 to rotate photoreceptor drum 210. When the photoreceptor drum 210 rotates, magnetism pattern section 221 fixed on drum flange 212 rotates similarly to how the photoreceptor drum 210 rotates. When the magnetism pattern section 221 rotates, a magnetic field of the magnetism pattern section 221 and FG pattern 222B cross each other on FG pattern section 222 fixed on side plate 213 to produce an induced electromotive force. Owing to this induced electromotive force, a minute voltage signal is generated on an output terminal of FG pattern $222B_1$, and minute voltage signal whose phase is deviated by 90° from the phase of voltage signal generated on an output terminal of FG pattern $222B_2$ by FG pattern $222B_1$. Each voltage signal is a signal of a sine wave which has, for each rotation of the magnetism pattern section 221, the frequency that is a half of the number of magnetic poles. Each voltage signal generated by the FG pattern section 222 is amplified by signal amplifier circuit 223A, and is further adjusted in terms of duty ratio in case of need. The signals outputted from the signal amplifier circuit 223A are formed by waveform forming circuit 223B to two square waves deviated in terms of phase by 90° each other.

Next, a rotation control device related to the invention which generates rotation detection signals based on two square waves signals generated by rotation detector 220.

Figure 21:
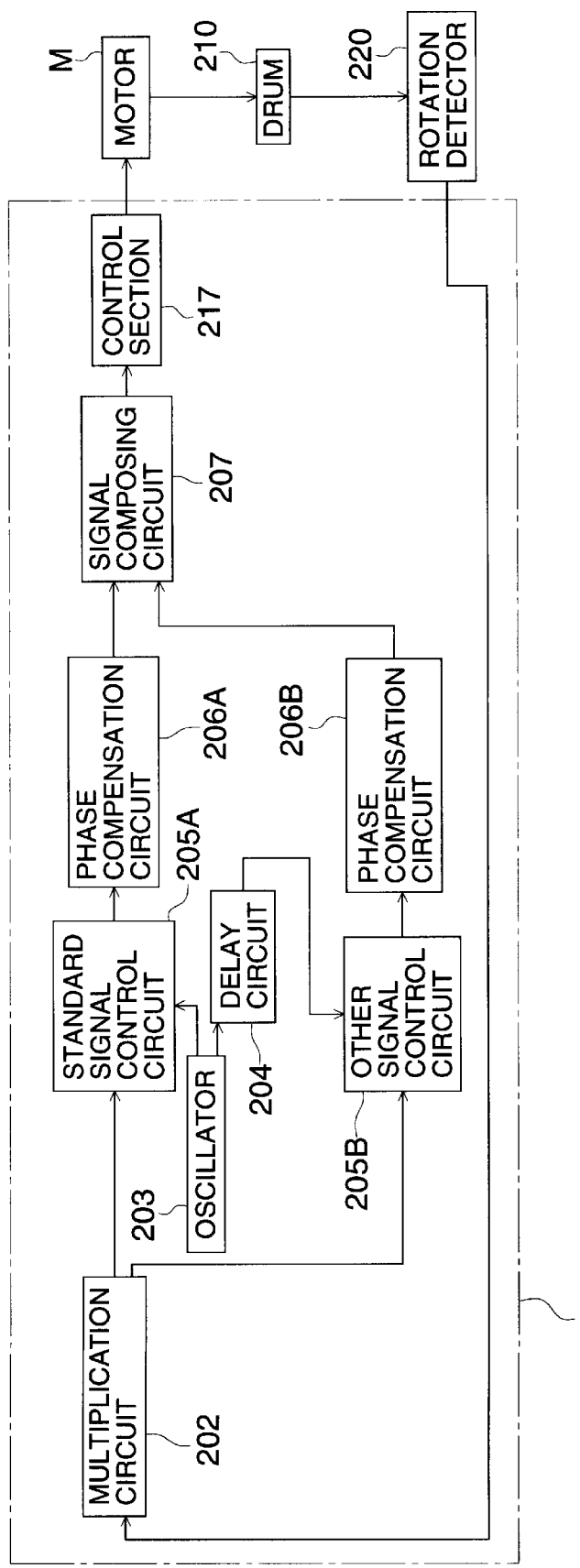
FIG. 21 is a block diagram showing the structure of the first embodiment of the invention.

FIG. 21 is a block diagram showing the structure of a rotation control device.

In FIG. 21, rotation control device 201 is structured to be provided with multiplication circuit 202 serving as a multiplication signal generating means that composes two square wave signals from rotation detector 220 and generates two 2-multiplication signals stated later, oscillator 203 serving as a clock generating means which generates standard clock signal CLK1 with a prescribed frequency, delay circuit 204 serving as a clock delay means which delays the standard clock signal CLK1 and generates delay clock signal CLK2, standard signal control circuit 205A serving as the first standard signal control means which generates a signal corresponding to a phase difference between the standard clock signal CLK1 and a signal on one side generated by multiplication circuit 202 and amplifies (weighing) the signal with a prescribed degree of amplification stated later, other signal control circuit 205B serving as the first other signal control means which generates a signal corresponding to a phase difference between the delay clock signal CLK2 and other signal generated by multiplication circuit 202 and amplifies (weighing) the signal with a prescribed degree of amplification stated later, phase compensation circuit 206A which adjusts the gain in the frequency area and the phase of the output signal of the standard signal control circuit 205A, phase compensation circuit 206B which adjusts the gain in the frequency area and the phase of the output signal of the other signal control circuit 205B, signal composing circuit 207 serving as the first signal composing means which composes output signals of the phase compensation circuits 206S and 206B, and control section 217 serving as the first control means which controls drive motor M of an electrophotographic apparatus in accordance with signals outputted from the signal composing circuit 207.

Now, operations of rotation control device 1 will be explained as follows.

Figure 24:
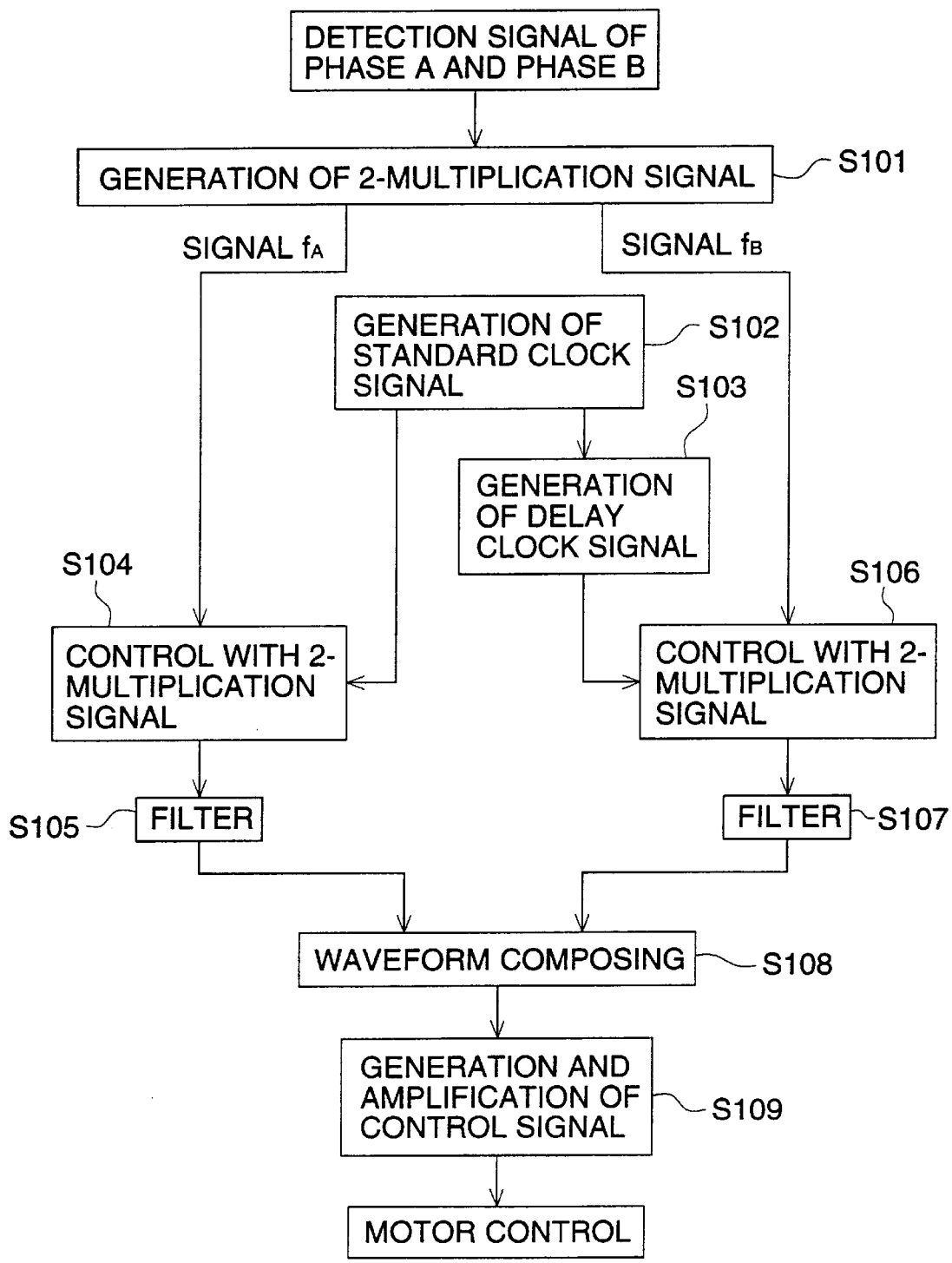
FIG. 24 is a flow chart showing operations of the first embodiment of the invention.

FIG. 24 is a flow chart showing operations of the rotation control device 1.

Figure 25:
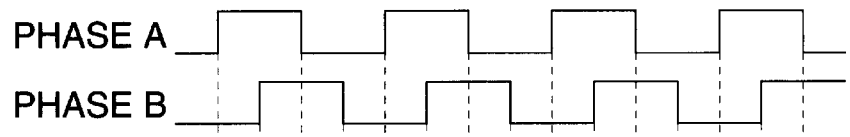
FIGS. 25(A) and 25(B) are diagrams showing a signal waveform in the first embodiment of the invention.
Figure 25:
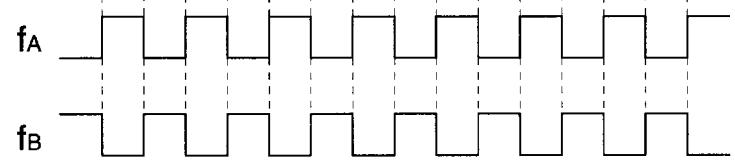

In FIG. 24, when photoreceptor drum 210 rotates and two square wave signals having a phase difference from FG pattern section 222 of 90° established in advance are generated, signals $f_A$ and $f_B$ in each of them each signal is doubled are generated in multiplication circuit 202 in step 101. The signal $f_A$ is a signal of 2-multiplication based on the rise and fall of the signal with standard phase A when one of square wave signal from rotation detector 220 is assumed to be a signal with standard phase A and the other is assumed to be a signal with other phase B. The signal $f_B$ is a signal of 2-multiplication based on the rise and fall of the signal with other phase B. In a method of generating these signals $f_A$ and $f_B$, an exclusive OR of the signal with standard phase A and the signal with other phase B is obtained, and two signals are composed to generate 2-multiplication signal $f_A$, while NOT of an exclusive OR of the signal with standard phase A and the signal with other phase B is obtained, and two signals are composed to generate 2-multiplication signal $f_B$. FIG. 25(A) shows waveforms of two square wave signals deviated in terms of phase by 90°, while FIG. 25(B) shows waveforms of 2-multiplication signals $f_A$ and $f_B$. As stated above, the rise of the signal $f_A$ is caused by the rise of standard phase A. The rise of the signal $f_B$ is caused by the rise of other phase B.

Though the signal with standard phase A and the signal with other phase B are established in advance to be deviated in terms of phase by 90° in this case, the phase is not deviated exactly by 90° due to a precision for processing a pattern, and an error (phase error from the absolute position of the pattern) could be contained. Let it be assumed here that the signal with standard phase A is a standard, and the signal with other phase B is considered to contain an error. In this case, when the state of rotation of photoreceptor drum 210 is constant, for example, due to an error of the other phase B, phase difference between the rise of 2-multiplication signal $f_A$ based on the rise and fall of the signal with standard phase A and the rise of 2-multiplication signal $f_B$ based on the rise and fall of the signal with other phase B can not be constant to generate an error. Accordingly, the phase difference between the 2-multiplication signal $f_A$ and the 2-multiplication signal $f_B$ is not necessarily 180° exactly.

In step 102, standard clock signal CLK1 with constant frequency is generated by oscillator 203. It is preferable that a precision of frequency (jitter) of the standard clock signal CLK1 is 10 times–30 times higher than a precision for an unevenness of rotational speed to be detected. It is also preferable that a frequency of the standard clock signal CLK1 is not less than 100 times that of pulse rate of rotation detector 220.

In step 103, delay circuit 204 generates delay clock signal CLK2 wherein the phase of the standard clock signal CLK1 generated in the step 102 is deviated by 180°. Incidentally, the delay clock signal CLK2 can also be generated by reversing the standard clock signal CLK1.

In step 104, an analog signal corresponding to the phase difference between signals is generated in standard signal control circuit 205A by the use of a phase comparator, for example, with an input signal of 2-multiplication signal $f_A$ and with a control signal of the standard clock signal CLK1. The signal thus generated is amplified (weighing) with a certain degree of amplification.

In step 105, a gain and a phase in a frequency area of a signal generated in step 104 are adjusted by a filter in phase compensation circuit 206A. This is conducted, when controlling the drive motor M, to prevent hunting of drive motor M.

In step 106, an analog signal corresponding to a phase difference between signals is generated by the use of, for example, a phase comparator, as in step 104, with 2-multiplication signal $f_B$ serving as an input signal and delay clock signal CLK2 serving as control signal, in other signal control circuit 205B. The signal thus generated is amplified (weighing) at an amplification degree lower than that in standard signal control circuit 205A in a time area.

With regard to the analog signal thus generated, even when the rotation of the photoreceptor drum 210 is constant as stated above, the phase error (bias equivalent) mentioned above is caused by a phase difference between delay clock signal CLK2 that serves as a standard and 2-multiplication signal $f_B$, due to a phase error from a pattern absolute position contained in the 2-multiplication signal $f_B$. When this signal has been composed at a level identical to signal $f_A$ that is based on standard phase A whose position is correct, an analog value containing an error of a phase difference is transmitted to the motor. This, namely, causes the state wherein the photoreceptor drum 210 does not rotate at the correct controlled rate and rotation unevenness is caused on the photoreceptor drum 210 due to an error of a phase difference contained in the analog signal, even when the rotation of the photoreceptor drum 210 is constant. Accordingly, if the state of rotation of the photoreceptor drum 210 is judged based on an analog signal based on 2-multiplication signal $f_A$ and on an analog signal containing an error based on 2-multiplication signal $f_B$, a precision for controlling is lowered.

When judging the state of rotation, therefore, the a signal serving as a standard is weighed greatly for judgment. Therefore, an analog signal based on 2-multiplication signal $f_B$ is amplified with an amplification degree that is smaller than that for an analog signal based on 2-multiplication signal $f_A$.

In step 107, a gain and a phase in a frequency area of a signal generated in step 106 are adjusted by a filter in phase compensation circuit 206B as in step 105.

In step 108, signals generated respectively in step 105 and step 107 are composed analogically in signal composing circuit 207, and thus, a rotation detecting signal showing a mean value of output levels of various signals is generated. This rotation detecting signal shows, when the photoreceptor drum 210 is rotating at the constant speed for example, an output level based on 2-multiplication signal $f_A$ weighed greatly, causing an influence of a phase difference of signal $f_B$ to be small. When the state of rotation of the photoreceptor drum 210 is greatly changed, on the other hand, even when a detection cycle of 2-multiplication signal $f_B$ fluctuates, the fluctuation is detected by signal $f_B$ before it is detected by the subsequent detection cycle of signal $f_A$, resulting in generation of rotation detecting signal which is highly responsive.

In step 109, a control signal that controls how motor M is driven in accordance with rotation detecting signals generated in step 108, is generated in control section 217. This control signal is sent to motor M after being power-amplified, and thereby the rotation of the photoreceptor drum 210 which is controlled in terms of drive is corrected.

As stated above, in the seventh embodiment, when a phase difference of 2-multiplication signal generated from two detecting signals of rotation detector 220 is detected based on the standard clock signal and delay clock signal, and when rotation detecting signals wherein an influence of an error of a phase difference is made small by weighing the signal serving as a standard greatly and weighing other signals less, is generated, it is possible to detect the state of rotation of the photoreceptor drum 210 at a high precision and to control the rotation with certainty even when an error takes place in a phase difference of detection signals generated from rotation detector 220.

Incidentally, though the seventh embodiment mentioned above employs an arrangement wherein analog signals generated as a weighing purpose respectively in standard signal control circuit 205A and other signal control signal 205B are amplified at a prescribed amplification degree, the invention is not limited to this, and it is also possible to employ an arrangement wherein a standard signal control circuit serving as the second standard signal control means which outputs DC component (showing the stable state of rotation) and AC component (showing a change such as rotation unevenness) both of analog signals generated in accordance with a phase difference between a standard clock signal and a standard multiplication signal and an other signal control circuit serving as the second other signal control means which outputs only AC component of analog signals generated in accordance with a phase difference between a delay clock signal and an other multiplication signal, are used and outputs of the above-mentioned circuits are composed by the second signal composing section. In this case, when the state of rotation fluctuates, the severe fluctuation is detected in analog signals generated by the other signal control circuit, and rotation detecting signals which are highly responsive are generated because the one extracted from analog signals generated by the other signal control circuit is only AC component showing a change in the state of rotation. When the state of rotation is stable and constant, on the other hand, an influence of an error of a phase difference is small because DC component of analog signals generated by the other signal control circuit is not extracted.

Further, the level of signals generated in step 106 in the seventh embodiment may also be made to be adjustable by the use of a gain controller or the like. In addition, the gain for a phase of phase control in step 106 may also be made to be adjustable.

In addition to the above, though the seventh embodiment employs an arrangement wherein output signals of rotation detector 220 are multiplied and controlled by multiplication circuit 202 of rotation control device 201, it is also possible to control output signals of the rotation detector 220 as an input to standard signal control circuit 205A and to other signal control circuit 205B, without multiplying them, for example. Though there has been explained the case wherein the rotation control device 201 conducts phase control by the use of detection signals, it is also possible to consider in the same manner as in the foregoing and to apply, for example, a method wherein detection signals are used for detecting rotational speed which is then compared with the speed obtained from the standard clock for conducting speed control.

Next, the eighth embodiment of the invention will be explained as follows.

In the eighth embodiment, the photoreceptor drum 210 of an electrophotographic apparatus in the seventh embodiment is rotated at a predetermined rotational speed, and a deviation amount of pulse intervals in multiplied pulse signals composed from detection signals which are generated by rotation detector 220 is measured in advance, thus pulse signals are corrected in accordance with the deviation amount. Incidentally, the structure of the electrophotographic apparatus and that of the rotation detector are the same as those in the seventh embodiment, and explanation therefor will be omitted accordingly.

Figure 26:
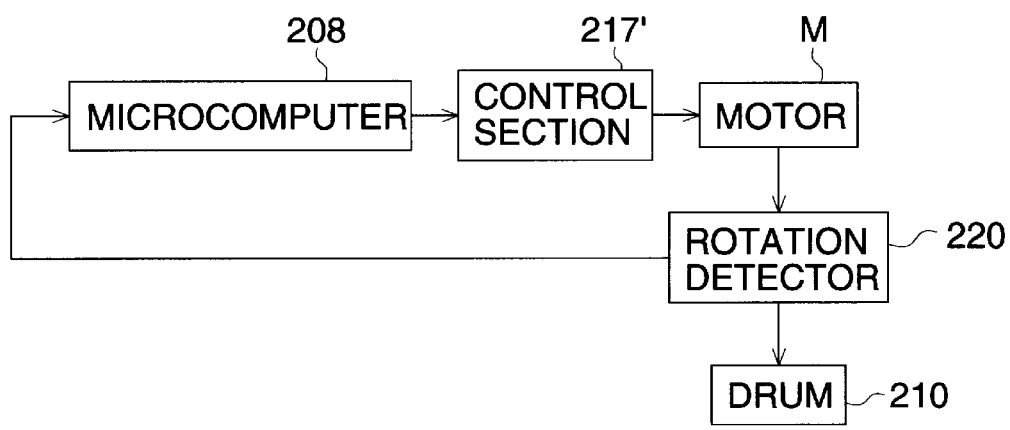
FIG. 26 is a block diagram showing the structure of the second embodiment of the invention.

FIG. 26 is a block diagram showing the structure of the eighth embodiment.

In the eighth embodiment in FIG. 26, detection signals from rotation detector 220 are processed by microcomputer 208, and control signals which control motor M in accordance with signals generated by the microcomputer 208 are generated and power-amplified by control section 217' serving as the second control means.

Figure 27:
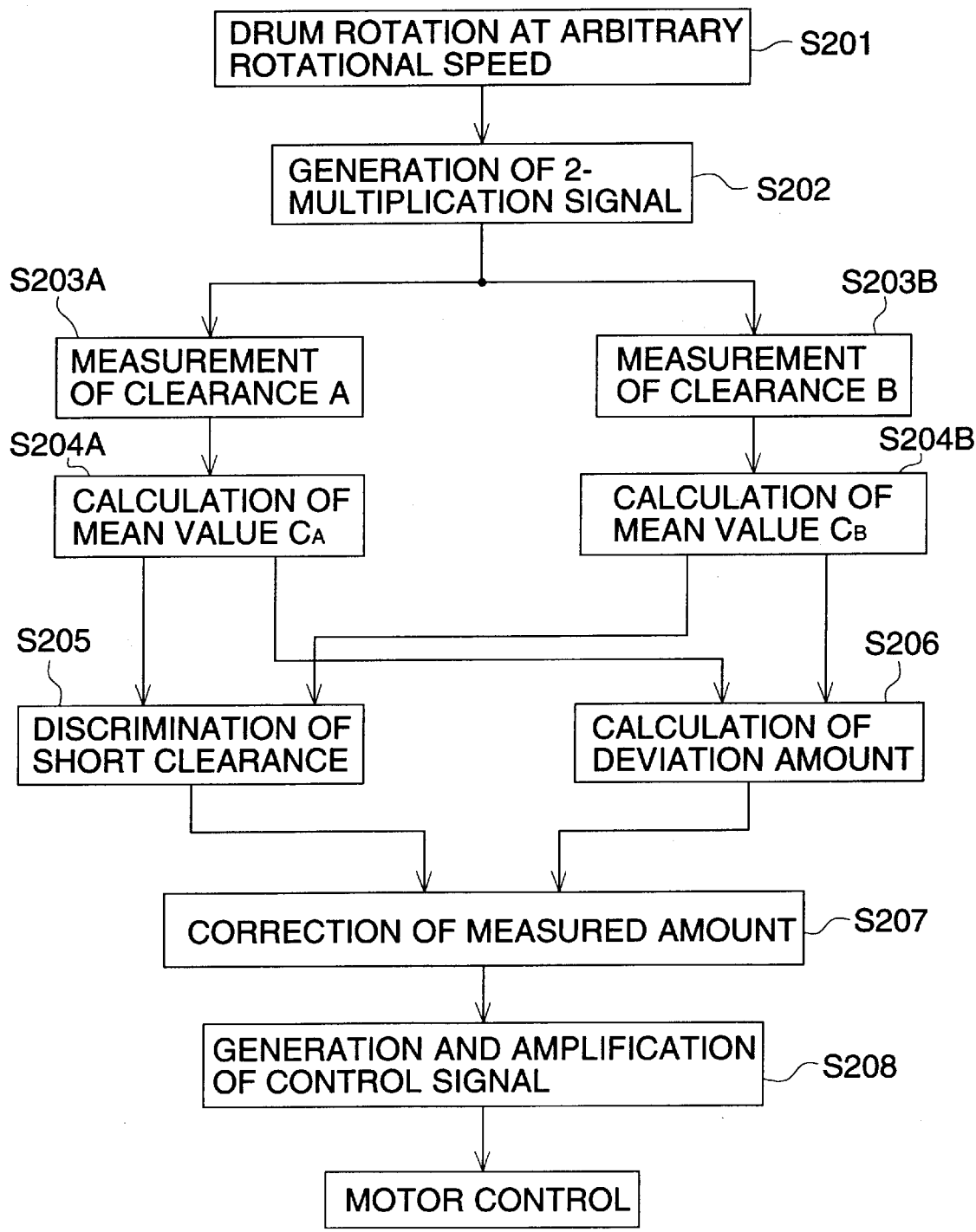
FIG. 27 is a flow chart showing operations of the second embodiment of the invention.

FIG. 27 is a flow chart showing operations of microcomputer 208.

In FIG. 27, photoreceptor drum 210 is rotated at a rotational speed used commonly, for example, in step 201. When the photoreceptor drum 210 is rotated, two square wave signals staggered in terms of phase by 90° each other are outputted from the rotation detector 220.

Figure 28:
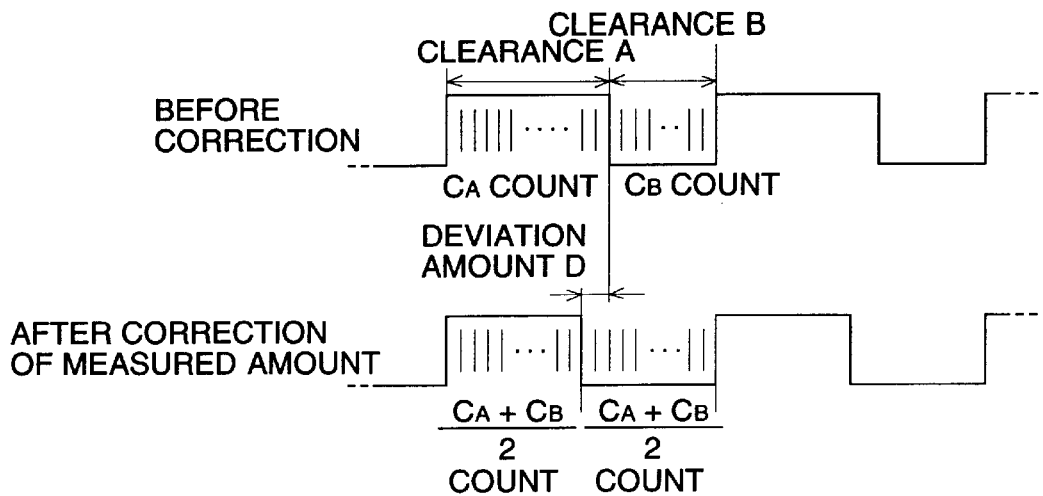
FIG. 28 is a diagram showing a signal waveform in the second embodiment of the invention.

In step 202, an exclusive OR, for example, of each of 2-phase detection signals generated by rotation detector 220 is obtained and 2-multiplication pulse signals obtained by composing two signals related to the exclusive OR are generated. FIG. 28 shows waveforms of the 2-multiplication signals.

In step 203A, interval A from the rise to the fall among pulse intervals of the 2-multiplication signals generated in step 202 is measured by the use of clock signals. The clock signal used in this case, however, is one whose clock interval is shorter than the interval A. Then, the sequence advances to step 204A where the count number of the measured interval A is stored m times, and mean value $C_A$ of count numbers for the interval A is calculated.

In step 203B, interval B from the fall to the rise of a 2-multiplication signal is counted by the use of a clock signal. Then, in step 204B, the count number of the counted interval B is stored m times, thus, mean value $C_B$ of the count number of the interval B is calculated.

In step 205, mean values $C_A$ and $C_B$ obtained in steps 204A and 204B are compared in terms of size, and a shorter interval, namely an interval whose mean value of count number is smaller, represented, for example, by interval B in waveforms in FIG. 28, is discriminated.

In step 206, deviation amount D which is obtained by halving a difference between mean value $C_A$ obtained in step 204A and that $C_B$ obtained in step 204B (=$(C_A-C_B)/2$) is calculated. This deviation amount D corresponds to an amount deviated from duty 50% of pulse signals subjected correctly to 2-multiplication. The calculated deviation amount D is stored corresponding to the rotational speed established in advance in step 201.

Operations in above-mentioned steps 201–206 are conducted in the case of installation of the present device, for example, or they are conducted periodically, so that an amount of deviation of the present device is detected.

In step 207, when rotation detector 220 detects the rotation actually, calculation pulses corresponding to deviation amount D obtained in step 206 is added to mean value $C_B$ of count number of interval B here, and calculation pulses corresponding to deviation amount D is subtracted from mean value $C_A$ of count number of interval A, with a count number of the shorter interval discriminated in step 206, so that 2-multiplication signals are corrected. FIG. 10 shows waveforms of the corrected 2-multiplication signals. All of the count numbers of the intervals after the correction take a value of $(C_A+C_B)/2$, which represents the 2-multiplication signal of duty 50%. Each count number of interval A or interval B of the corrected 2-multiplication signal is outputted as a rotation detecting signal.

Incidentally, when photoreceptor drum 210 is used to be rotated at the rotational speed which is different from one established in step 201, in other words, when it is used under the rotational speed that is twice the rotational speed established in step 201, the pulse interval of the 2-multiplication signal is halved. Therefore, the pulse interval needs to be corrected by halving the deviation amount D obtained in step 206. With regard to step 207, a pulse interval of 2-multiplication signal may also be corrected instead of correcting each count number of interval A and interval B. However, when correcting pulse intervals, a phase difference between two FG patterns needs to be established to 90° or less (not more than (180/n)° when FG patterns in quantity of n are used). When FG patterns in quantity of n are used, pulse intervals are corrected using the shortest interval as a standard.

In step 208, rotation detecting signals generated in step 207 are sent to control section 217', and control signals which control the state of drive of motor M based on the rotation detecting signals are generated. These control signals are sent to motor M after being power-amplified to control the drive of motor M, thus the rotation of photoreceptor drum 210 is corrected.

As stated above, the microcomputer 8 has functions as a pulse signal generating means of a phase error detection means, a means for measuring the first and second pulse intervals, a deviation amount detecting means and a correction means.

As stated above, in the eighth embodiment, pulse intervals of 2-multiplication signals including errors generated from detection signals of rotation detector 220 are made to be mostly the same, namely, the duty of the 2-multiplication signals is corrected nearly to 50%. Therefore, an influence of a phase error of the detection signals of rotation detector 220 is reduced, whereby the state of rotation of photoreceptor drum 210 can be detected at a high precision, and the rotation of the photoreceptor drum 210 can be controlled stably.

Figure 29:
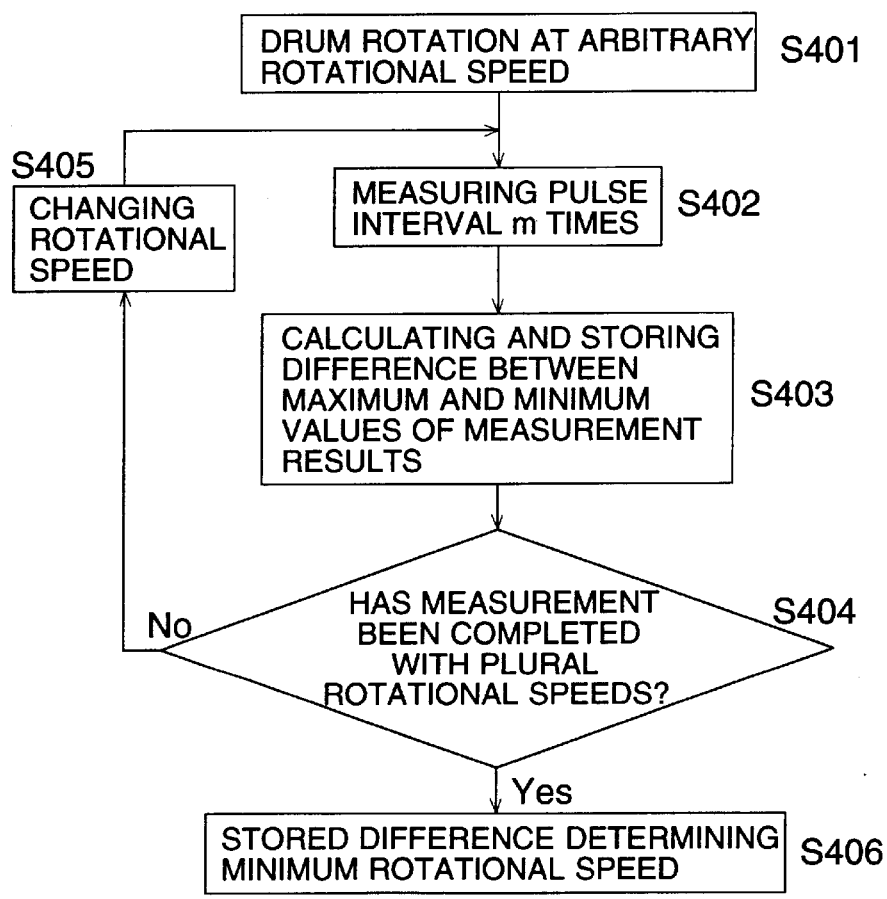
FIG. 29 is a flow chart of a method to detect the rotational speed having small unevenness of rotation.

Incidentally, with regard to the rotational speed of the photoreceptor drum 210 established in step 201 in the eighth embodiment, it is preferable that the rotational speed has less unevenness of rotational speed. In one of methods to detect the rotational speed having less unevenness of rotational speed, a photoreceptor drum is rotated at an arbitrary rotational speed in step 401 first, and then, pulse intervals are measured m times and stored in step 402, as shown in a flow chart of FIG. 29, for example. Then, in step 403, the maximum value and the minimum value among the stored count numbers are obtained, and a difference between the maximum value and the minimum value is stored in accordance with the rotational speed of the photoreceptor drum. In steps 404 and 405, aforesaid operations are conducted by rotating the photoreceptor drum at plural rotational speeds, and in step 406, the rotational speed having the smallest difference between the stored maximum value and the minimum value is determined as a rotational speed having less unevenness of rotational speed.

Next, the ninth embodiment of the invention will be explained as follows.

In the ninth embodiment, a rotation detector wherein FG patterns multiplied in the radial direction are formed to be n-fold ($n \geq 2$) is used, and detection signals generated at the rotation detector are processed.

Figure 30:
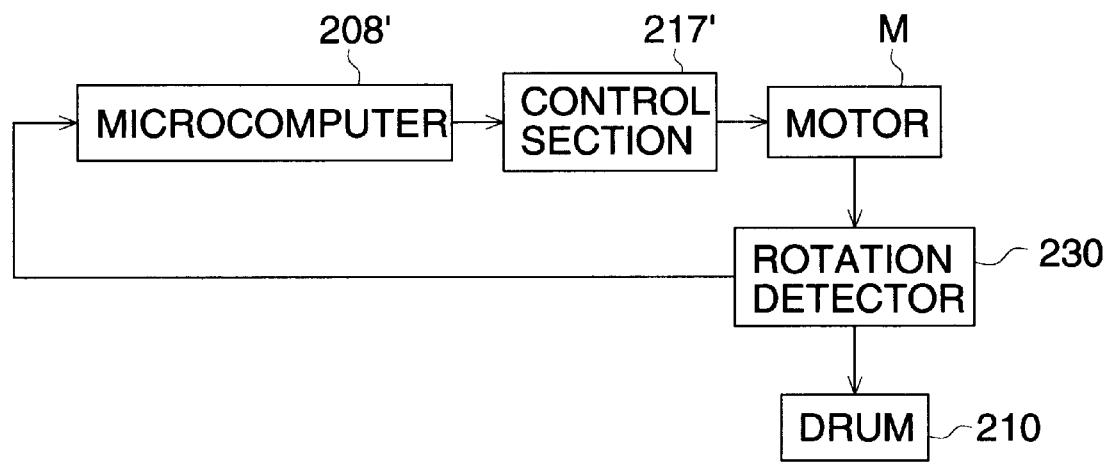
FIG. 30 is a block diagram showing the structure of the third embodiment of the invention.

FIG. 30 is a block diagram showing the structure of the ninth embodiment.

In the structure of the ninth embodiment in FIG. 30, detection signals from rotation detector 230 are processed by microcomputer 208' used, and control signals which control motor M in accordance with signals generated from the microcomputer 208' are generated and power-amplified in control section 217'. The motor M is controlled in terms of drive by the control signals, whereby the rotation of the photoreceptor drum is controlled.

First, an outline of rotation detector 230 wherein n-fold FG patterns are formed will be explained as follows.

What is different from the structure of the rotation detector 220 in the first embodiment in the rotation detector 230 is that FG pattern section 232 is used in place of FG pattern 222. Other structures and operations are the same as those in the structure of the rotation detector 220, and explanation therefor will be omitted accordingly.

Figure 31:
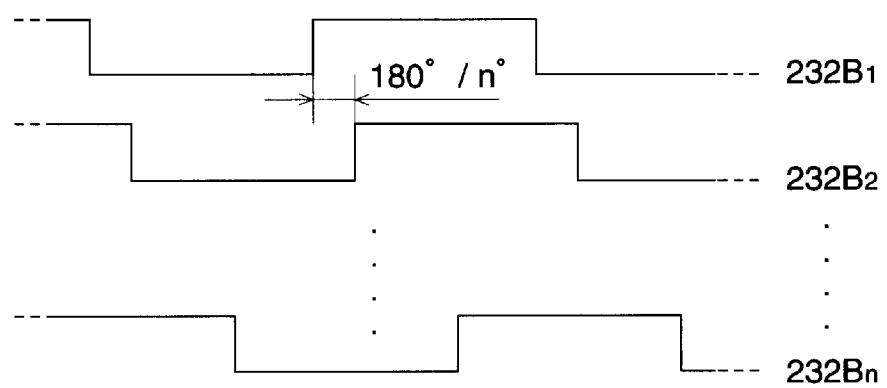
FIG. 31 is an enlarged view of an FG pattern section in the third embodiment of the invention.

FIG. 31 shows an enlarged diagram of the FG pattern section 232.

In FIG. the 31, FG pattern section 232 is formed in a way wherein FG patterns $232B_1, 232B_2, \ldots, 232B_n$ in quantity of n each having a pattern of recessed portions and projected portions in quantity identical to the number of magnetic poles. of magnetism pattern section 221, being circular and comb-shaped, and having a different radius are formed on the same plane of PCB with their centers located at the same position (shown to be linear in the figure, but actually circular). Adjacent FG patterns are arranged to be staggered each other in terms of phase by $(180/n)°$. This FG pattern section 232 is fixed on side plate 213 which faces the magnetism pattern section 221 and is away therefrom by the constant distance, similarly to the rotation detector 220. Signals generated from each of FG patterns $232B_1$–$232B_n$ are outputted from an unillustrated output terminal led from both ends on each of FG patterns $232B_1$–$232B_n$, and then are connected to an input terminal of signal processing section 223.

Next, operations of microcomputer 208' that controls square wave signals in quantity of n generated at the rotation detector 230 will be explained as follows.

Figure 32:
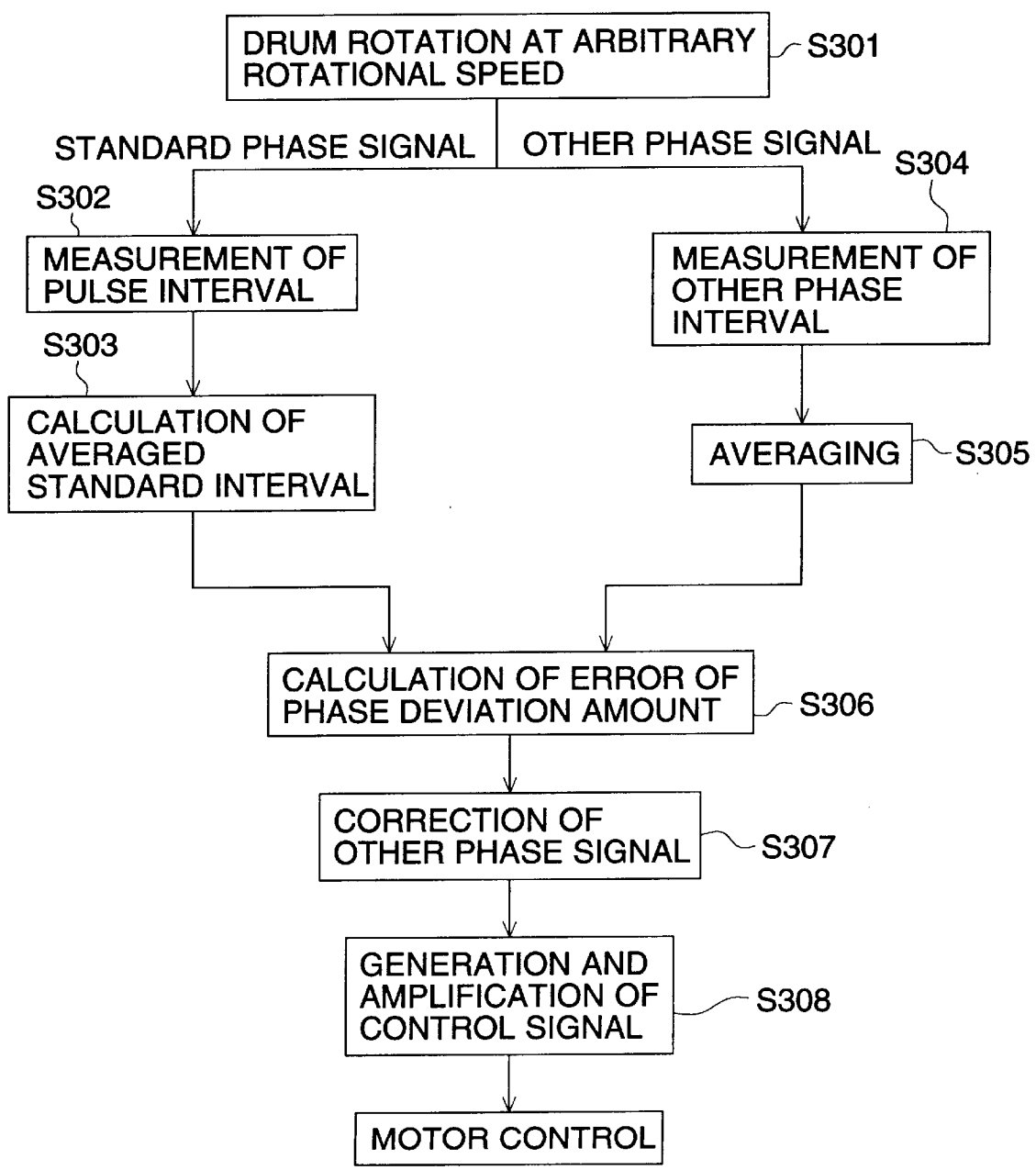
FIG. 32 is a flow chart showing operations of the third embodiment of the invention.
Figure 33:
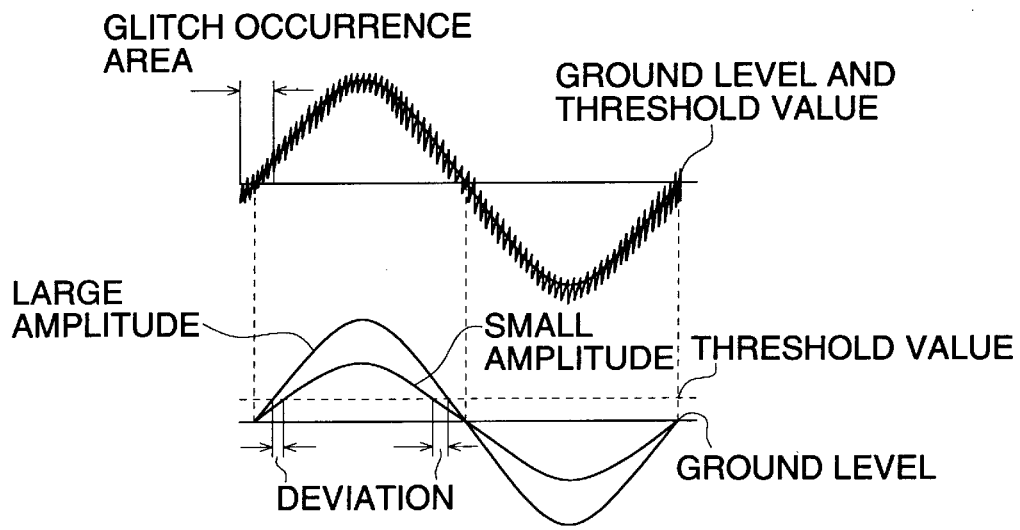
FIGS. 33(a) to 33(d) are diagrams illustrating phase deviation in the case of forming a waveform from detection signals having different amplitudes.
Figure 33:
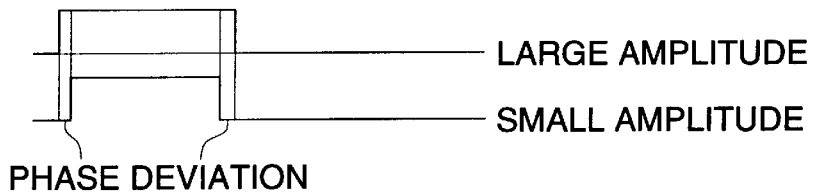
Figure 33:
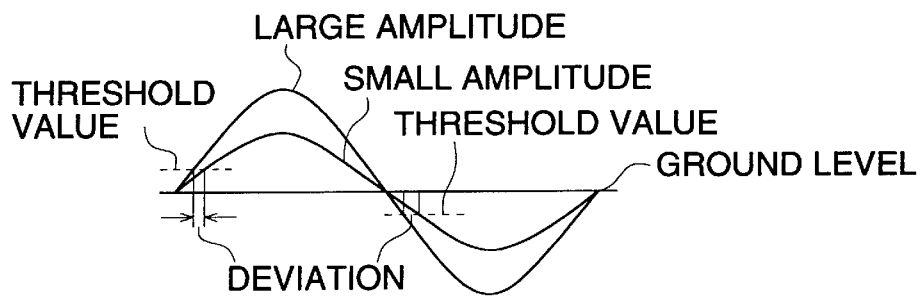
Figure 33:
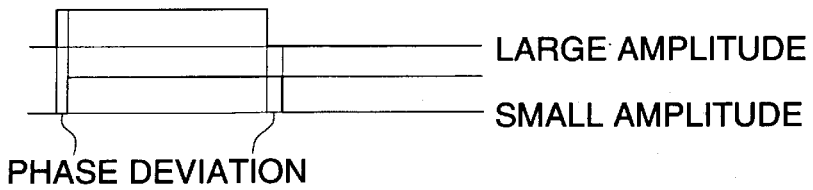

FIG. 32 is a flow chart showing operations of the microcomputer 208'.

In FIG. 32, when photoreceptor drum 210 is rotated at the rotational speed which is, for example, one used commonly, in step 301, detection signals in quantity of n which are staggered in terms of phase are outputted from the rotation detector 230.

In step 302, an arbitrary one pattern out of FG pattern $32B_1$–$32B_n$ of the rotation detector 230, for example, FG pattern $32B_1$ is determined to be a standard phase, and pulse intervals of detection signals generated from the FG pattern $32B_1$ are measured. The pulse interval in this case is assumed to be an interval from one rise to the following rise of the detection signal. This pulse interval is counted by the use of a clock signal. The clock signal used in this case, however, is a signal wherein a clock interval is shorter than a pulse interval and a frequency precision (jitter) is higher as in the case of a standard clock signal in the first embodiment, and it is preferable that the frequency is not less than 100 times that of the signal multiplied.

In step 303, pulse intervals measured in step 302 are stored m times to calculate a mean value of the pulse intervals, and a value (hereinafter referred to as standard interval $K_1$) wherein the mean value of the pulse intervals is multiplied by ½ n (n represents the number of FG patterns) is obtained. This standard interval $K_1$ agrees with an interval corresponding to a phase difference between signals generated by each FG pattern established when the FG pattern is formed.

In step 304, an interval (hereinafter referred to as other phase interval $K_2$) between a rise of the signal of aforesaid standard phase and either one other phase other than the standard phase, for example, a rise of the signal generated at FG pattern $232B_2$ is measured. This other phase interval $K_2$ is counted by the use of a clock signal. However, the clock signal used in this case is a clock signal identical to the clock signal used in step 302 wherein a clock interval is shorter than other phase interval $K_2$. Even for the signals generated at other FG patterns, an interval between a rise of the signal with a standard phase and a rise of the signal with other phase is measured in the same manner as in the foregoing (intervals measured in succession are assumed to be other phase intervals $K_3, \ldots, K_n$).

In step 305, each of the other phase intervals $K_2$–$K_n$ measured in step 304 is stored m times, and each mean value of the other phase intervals $K_2$–$K_n$ is calculated.

In step 306, an error of a phase difference corresponding to each other phase for the standard phase is calculated from standard interval $K_1$ obtained in step 303 and each mean value of each of other phase intervals $K_2$–$K_n$ obtained in step 305. For example, an error of a phase difference between the signal with a standard phase and the signal with a phase of FG pattern $232B_2$ can be obtained from the difference between the standard interval $K_1$ calculated in step 303 and the other phase interval $K_2$ calculated in step 305, and an error of a phase difference between the signal with a standard phase and the signal with a phase of FG pattern $232B_n$ can be obtained from the difference between a value wherein the standard interval $K_1$ is multiplied by $(n-1)$ and the other phase interval $K_n$. This error of a phase difference is stored to be associated with the rotational speed established in advance in step 301.

Operations in aforesaid step 301–step 306 are either conducted in the case of installation of the apparatus, for example, or conducted periodically, and whereby, an error of a phase difference in the present apparatus can be detected.

In step 307, a phase of the signal with each other phase is corrected in accordance with an error of each phase difference stored in step 306, when the rotation is detected actually by rotation detector 230. In this case, when the photoreceptor drum 210 is used under the condition of the rotational speed which is different from that established in step 301, a value of an error of the phase deviation amount obtained in step 306 is converted into the value under that rotational speed so that a phase of the signal with other phase may be corrected.

In step 308, control signals are generated and amplified at control section 217' based on the signals corrected in step 307 in the same manner as in the eighth embodiment, and motor M is controlled in terms of drive by the control signals, and thus the rotation of photoreceptor drum 210 is corrected.

As stated above, microcomputer 208' has functions as a standard phase difference calculating means of a phase error detecting means, a phase difference calculating means, an error calculating means and a correction means.

As stated above, in the ninth embodiment wherein an error of a phase difference is corrected for each of detection signals in quantity of n which are generated in rotation detector 230 and are deviated in terms of phase, it is possible to improve a precision for detecting the state of rotation and thereby the rotation of the photoreceptor drum 210 can be controlled stably.

Incidentally, it is preferable that the rotational speed of the photoreceptor drum 210 established in step 301 in the ninth embodiment is the rotational speed having less unevenness of rotational speed, which is the same as what is explained in the eighth embodiment.

Though a rotation detector is equipped with 2-fold FG patterns in aforesaid seventh and eighth embodiments, it is also possible to employ a rotation detector equipped with multiplied n-fold FG patterns (n≧3). Further, the rotation detector of the invention is not limited to one wherein FG patterns are used, and those of other types such as, for example, a rotation detector wherein rotation is detected by an optical encoder or by a magnetic encoder based on phase-deviated signals may also be used.

In addition to the above, in aforesaid seventh—ninth embodiments, there has been explained an occasion wherein the state of rotation of the photoreceptor drum 210 is detected by a rotation detector. However, it is also employ an arrangement wherein the state of rotation of drive motor M is detected by a rotation detector provided on the drive motor. Further, when providing a rotation detector on photoreceptor drum 210, it is also possible to provide the rotation detector on an end of the photoreceptor drum 210.

In addition, the photoreceptor drum used in aforesaid seventh—ninth embodiments may also be of the structure wherein drum shaft 211 is fixed on side plate 213 as in FIG. 12 and photoreceptor drum 210 and drum flange 212 are driven for rotation by drum gear G.

What is claimed is:

1. An apparatus for detecting rotation of a rotating member having an axis of rotation, comprising:

a magnetism pattern section in which plural magnetic poles are arranged coaxially with the rotating member on a plane;

a FG (frequency generating) pattern section including plural toothed wire circuits arranged coaxially with the rotating member on a plane in which a tooth arrangement of each toothed wire circuit is circularly deviated from others, wherein the magnetism pattern section and the FG pattern sections are located so as to face each other and either one of the magnetism pattern section and the FG pattern section is rotated together with the rotating member so that plural wave signals are electrically induced by the plural toothed wire circuits and each wave signal having a frequency and a different phase from others in accordance with the circular deviation in the teeth arrangement; and signal processing means for synthesizing the plural wave signals so as to output a multiplication signal having a multiplied frequency and for detecting the rotation of the rotating member based on the multiplication signal.

2. The apparatus of claim 1, wherein each of the plural toothed wire circuits is disposed on a different coaxial circle from others.

3. The apparatus of claim 1, wherein each of the plural toothed wire circuits has an effective operating conductor crossing with a magnetic field of the magnetism pattern section and a length of the effective operating conductor of each of the plural toothed wire circuits is almost the same as that of others.

4. The apparatus of claim 1, wherein the circular deviation in the teeth arrangement is so set that the different phase of the electric wave signal is 180/n degrees in angle in which "n" is a number of the plural toothed wire circuits.

5. The apparatus of claim 1, further comprising control means for controlling the rotation of the rotating member, wherein the control means comprises a clock generating means for generating a standard clock signal with a prescribed frequency, a clock delay means for generating a delay clock signal obtained by delaying the standard clock signal in accordance with a predetermined phase difference, a rotation detection signal generating means for determining one of the plural wave signals as a standard signal, for detecting a phase difference between the standard clock signal and the standard signal, for further detecting a phase difference between the delay clock signal and another one of the plural wave signals, and for generating the rotation detection signal showing a rotating condition of the rotating member in accordance with the detected phase difference, and a first controller for controlling the rotation of the rotating member in accordance with the rotation detection signal.

6. The apparatus of claim 1, further comprising control means for controlling the rotation of the rotating member, wherein the control means comprises a phase error detection means for measuring a phase difference between the plural wave signals and for detecting a phase error between a predetermined phase difference and the measured phase difference;

correcting means for outputting a correction signal based on the phase error detected by the phase error detection means; and a second controller for controlling the rotation of the rotating member in accordance with the correction signal.

7. An apparatus for controlling rotation of a rotating member by detecting a rotating condition based on plural detection signals which are generated in accordance with the rotating condition of the rotating member and provided with phase difference, comprising:

a clock generating means for generating a standard clock signal with a prescribed frequency, a clock delay means for generating a delay clock signal obtained by delaying the standard clock signal in accordance with a predetermined phase difference, a rotation detection signal generating means for determining one of the plural wave signals as a standard signal, for detecting a phase difference between the standard clock signal and the standard signal, for further detecting a phase difference between the delay clock signal and another one of the plural wave signals, and for generating the rotation detection signal showing a rotating condition of the rotating member in accordance with the detected phase difference, and a first controller for controlling the rotation of the rotating member in accordance with the rotation detection signal.

8. The apparatus of claim 7, wherein the rotation detection signal generating means comprises a multiplication signal generating means for generating plural multiplication signals from the plural detection signals;

a first standard signal control means which determines one of the plural multiplication signals as the standard multiplication signal, generates a signal in accordance with a phase difference between the standard clock signal and the standard multiplication signal, and conducts a weighting of the signal by amplifying the signal with a prescribed amplifying degree;

a first another signal control means which generates a signal in accordance with a phase difference between the delaying clock signal and another multiplication signal and conducts a weighting of the signal by amplifying the signal with an amplifying degree smaller than the prescribed amplifying degree; and a first signal synthesizing means for generating the rotation detection signal by synthesizing the signals generated by the first standard signal control means and the first another signal control means.

9. The apparatus of claim 7, wherein the rotation detection signal generating means comprises a multiplication signal generating means for generating plural multiplication signals from the plural detection signals;

a second standard signal control means which determines one of the plural multiplication signals as the standard multiplication signal, generates a signal in accordance with a phase difference between the standard clock signal and the standard multiplication signal, and outputs a DC component signal and an AC component signal of the signal;

a second another signal control means which generates a signal in accordance with a phase difference between the delaying clock signal and another multiplication signal and outputs only an AC component signal of the signal; and a second signal synthesizing means for generating the rotation detection signal by synthesizing the signals generated by the first standard signal control means and the first another signal control means.

10. An apparatus for controlling rotation of a rotating member by detecting a rotating condition based on plural detection signals which are generated in accordance with the rotating condition of the rotating member and provided with phase difference, comprising:

a phase error detection means for measuring a phase difference between the plural wave signals and for detecting a phase error between a predetermined phase difference and the measured phase difference;

correcting means for outputting a correction signal based on the phase error detected by the phase error detection means; and a second controller for controlling the rotation of the rotating member in accordance with the correction signal, wherein the phase error detection means comprises:

a pulse signal generating means for generating plural multiplication pulse signals from the plural detection signals;

a measuring means for measuring a first interval from a rise-up phase to a fall-down phase of the pulse signal and a second interval from the fall-down phase to the next rise-up phase; and a deviation amount detection means for obtaining a deviation amount from a pulse condition of a duty ratio 50% of the pulse signal; and wherein the correcting means corrects the pulse signal based on the deviation amount from the pulse condition of the duty ratio 50% of the pulse signal.

11. The apparatus of claim 10, wherein the pulse signal generating means generates a multiplication pulse signal based on the plural wave signals generated when the rotating member is rotated at a predetermined rotational speed, the measuring means measures the first and second interval by using predetermined clock signals, the deviation amount detection means calculates a half of the difference between counted numbers of the first and second pulse intervals and stores it as the amount of deviation from the pulse condition of the duty ratio 50% of the pulse signal, and the correcting means corrects each counted number of the first and second pulse intervals based on the stored amount of deviation.

12. An apparatus for controlling rotation of a rotating member by detecting a rotating condition based on plural detection signals which are generated in accordance with the rotating condition of the rotating member and provided with phase difference, comprising:

a phase error detection means for measuring a phase difference between the plural wave signals and for detecting a phase error between a predetermined phase difference and the measured phase difference;

correcting means for outputting a correction signal based on the phase error detected by the phase error detection means; and a second controller for controlling the rotation of the rotating member in accordance with the correction signal, wherein the phase error detection means comprises:

a standard phase error calculating means for determining one of the plural wave signals as a standard phase detection signal and for calculating a standard phase difference corresponding to a number of the plural wave signals on the basis of a frequency of the standard phase detection signal;

a phase difference calculating means for calculating a phase difference between the standard phase detection signal and the other wave signals than the standard phase detection signal; and an error calculating means for calculating an error in the phase difference of the other wave signals for the standard phase detection signal from the standard phase difference and the calculated phase differences, and wherein the correcting means corrects the phase of the other wave signals in accordance with the error in the phase difference.

13. The apparatus of claim 12, wherein the standard phase error calculating means and the phase error calculating means of the phase error detection means calculates the standard phase difference and the calculated phase differences from the plural wave signals generated when the rotating member is rotated at a predetermined rotation speed, the error calculating means calculates the error from the standard phase difference and the calculated phase differences and stores the calculated error, and the correcting means corrects the phase of the other wave signals based on the stored error in the phase difference.

14. The apparatus of claim 13, wherein the predetermined rotation speed is a rotation speed at which rotational irregularities become minimum.

15. An image forming apparatus, comprising:

a rotating member rotated by a driving means;

a rotation detecting means for detecting the rotating condition of the rotating member from relative action between (1) a magnetism pattern section including plural magnetic poles which are arranged coaxially with the rotating member, and (2) a FG (frequency generating) pattern section including a wire circuit corresponding to the plural magnetic poles; and a control means for controlling the rotation of the rotating member based on the rotating condition detected by the rotation detecting means.

16. The apparatus of claim 15, wherein the magnetism pattern section includes the plural magnetic poles arranged coaxially with the rotating member the FG pattern section includes a toothed wire circuit which correspond in number to the number of the magnetic poles and is spaced with a predetermined gap from the magnetism pattern section and is located so as to face the magnetism pattern section, and the rotation detecting means detects the rotating condition based on an electric signal electrically induced by relative action between the magnetism pattern section and the FG pattern section with the rotation of the rotating member.

17. The apparatus of claim 15, wherein the magnetism pattern section is rotated together with the rotation of the rotating member and the FG pattern section is fixed relative to the rotating member.

18. The apparatus of claim 15, wherein the FG pattern section is rotated together with the rotation of the rotating member and the magnetism pattern section is fixed relative to the rotating member.

19. The apparatus of claim 18, wherein the rotation detecting means comprises a brush which slidablly contacts with a pattern of the FG pattern section.

20. The apparatus of claim 18, wherein the rotation detecting means comprises a noise eliminating means for eliminating noise generated on the brush.

21. The apparatus of claim 18, wherein the rotation detecting means comprises an amplifying section for amplifying an output signal from the FG pattern section and a wave shaping means for shaping an output signal from the amplifying means, and wherein the amplifying means and the wave shaping means are mounted on the same board as that of the FG pattern section.

22. The apparatus of claim 18, wherein the rotation detecting means comprises a regulating means for regulating a gap between the magnetism pattern section and the FG pattern section.

23. The apparatus of claim 18, wherein the rotation detecting means comprises a magnetic field protection means for protecting an external magnetic field from entering into a magnetic field generated in the magnetism pattern section and the FG pattern section.

24. The apparatus of claim 18, wherein the rotating member is a rotating member of an electrophotographic apparatus.

* * * * *